US010696381B2

(12) United States Patent
Plude et al.

(10) Patent No.: US 10,696,381 B2
(45) Date of Patent: Jun. 30, 2020

(54) HYDRAULIC SYSTEMS FOR SHRINKING LANDING GEAR

(71) Applicant: The Boeing Company, Chicago, IL (US)

(72) Inventors: Leo W. Plude, Woodinville, WA (US); Malcolm S. Bryant, Maple Valley, WA (US); Gary M. Lindahl, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 403 days.

(21) Appl. No.: 15/866,107

(22) Filed: Jan. 9, 2018

(65) Prior Publication Data

US 2019/0210716 A1 Jul. 11, 2019

(51) Int. Cl.
*B64C 25/22* (2006.01)
*B64C 25/60* (2006.01)

(52) U.S. Cl.
CPC .............. *B64C 25/22* (2013.01); *B64C 25/60* (2013.01)

(58) Field of Classification Search
CPC ......... B64C 25/22; B64C 25/58; B64C 25/60; B64C 2025/008
See application file for complete search history.

(56) References Cited

U.S. PATENT DOCUMENTS 5,094,407 A * 3/1992 Jampy ....................... F16F 9/06 244/104 FP
5,908,174 A * 6/1999 Churchill ................ B64C 25/18 244/102 SS
8,070,095 B2 12/2011 Luce et al.
8,556,209 B2 10/2013 Luce
8,695,764 B2 4/2014 Luce
8,727,273 B2 5/2014 Luce
9,321,525 B2 4/2016 Luce
9,481,453 B2 11/2016 Luce
9,815,549 B1 * 11/2017 Shammoh ............... B64C 25/30
(Continued)

OTHER PUBLICATIONS

European Patent Office, "Extended European Search Report," issued in connection with European Patent Application No. 18201222.9, dated Apr. 24, 2019, 8 pages.

*Primary Examiner* — Richard R. Green
*Assistant Examiner* — Arfan Y Sinaki
(74) *Attorney, Agent, or Firm* — Hanley, Flight & Zimmerman, LLC

(57) ABSTRACT

Hydraulic systems for shrinking landing gear shrink are described. An example apparatus includes a landing gear strut, a transfer cylinder, and aircraft hydraulics. The landing gear strut has an outer cylinder and an inner cylinder. The inner cylinder moves relative to the outer cylinder from a first position to a second position as the landing gear strut moves from a deployed position to a retracted position. The landing gear strut has a first length when the inner cylinder is in the first position and a second length less than the first length when the inner cylinder is in the second position. The transfer cylinder exchanges hydraulic fluid and gas with the landing gear strut as the landing gear strut moves from the deployed position to the retracted position. The aircraft hydraulics hydraulically actuate the landing gear strut to move from the deployed position to the retracted position.

22 Claims, 9 Drawing Sheets

(56) References Cited

U.S. PATENT DOCUMENTS

| | | | | | |
|---|---|---|---|---|---|
| 2008/0111022 | A1* | 5/2008 | Lahargou | B64C 25/60 | 244/100 R |
| 2010/0219290 | A1* | 9/2010 | Luce | B64C 25/14 | 244/102 SL |
| 2016/0101877 | A1* | 4/2016 | Shepherd | G01F 23/296 | 29/402.18 |
| 2019/0145390 | A1* | 5/2019 | Galloway | F04B 1/328 | 417/15 |

* cited by examiner

HYDRAULIC SYSTEMS FOR SHRINKING LANDING GEAR

FIELD OF THE DISCLOSURE

This disclosure relates generally to landing gear for aircraft and, more particularly, to hydraulic systems for shrinking landing gear.

BACKGROUND

Aircraft (e.g., commercial aircraft) commonly include landing gear (e.g., left main landing gear, right main landing gear, etc.) that may be hydraulically actuated to move between a deployed position and a retracted position. For example, the landing gear of an aircraft may by hydraulically actuated to move from the deployed position to the retracted position subsequent to and/or in connection with a takeoff procedure of the aircraft, and from the retracted position back to the deployed position prior to and/or in connection with a landing procedure of the aircraft. Hydraulic actuation of the landing gear typically occurs in response to a manual actuation (e.g., via a pilot of the aircraft) of a landing gear lever located in a cockpit of the aircraft.

Some known aircraft implement landing gear that must be shrunk (e.g., reduced in length) in conjunction with being moved from the deployed position to the retracted position. For example, the length of the landing gear may need to be reduced (e.g., shrunk) such that the landing gear is able to fit within the spatial confines of a well of the aircraft that stows the landing gear in the retracted position. In such known aircraft, the shrinking of the landing gear commonly occurs in parallel with actuating the landing gear from the deployed position to the retracted position, and/or is dependent upon the kinematic motion associated with rotating and/or moving the landing gear from the deployed position to the retracted position.

SUMMARY

Hydraulic systems for shrinking landing gear are disclosed. In some examples, an apparatus is disclosed. In some disclosed examples, the apparatus comprises a landing gear strut, a transfer cylinder, and aircraft hydraulics. In some disclosed examples, the landing gear strut has an outer cylinder and an inner cylinder. In some disclosed examples, the inner cylinder is to move relative to the outer cylinder from a first position to a second position as the landing gear strut moves from a deployed position to a retracted position. In some disclosed examples, the landing gear strut has a first length when the inner cylinder is in the first position and a second length less than the first length when the inner cylinder is in the second position. In some disclosed examples the transfer cylinder is to exchange hydraulic fluid and gas with the landing gear strut as the landing gear strut moves from the deployed position to the retracted position. In some disclosed examples, the aircraft hydraulics are to hydraulically actuate the landing gear strut to move from the deployed position to the retracted position.

In some examples, an apparatus is disclosed. In some disclosed examples, the apparatus comprises a landing gear strut, a transfer cylinder, aircraft hydraulics, a pressure-operated check valve, and a walking beam linkage. In some disclosed examples, the landing gear strut is rotatably coupled to a wing of an aircraft. In some disclosed examples, the landing gear strut has an outer cylinder and an inner cylinder. In some disclosed examples, the inner cylinder is to move relative to the outer cylinder from a first position to a second position as the landing gear strut rotates from a deployed position to a retracted position. In some disclosed examples, the landing gear strut has a first length when the inner cylinder is in the first position and a second length less than the first length when the inner cylinder is in the second position. In some disclosed examples the transfer cylinder is to exchange hydraulic fluid and gas with the landing gear strut as the landing gear strut rotates from the deployed position to the retracted position. In some disclosed examples, the aircraft hydraulics are to hydraulically actuate the landing gear strut to rotate from the deployed position to the retracted position. In some disclosed examples, the pressure-operated check valve is operatively coupled to the aircraft hydraulics, the transfer cylinder, and the landing gear strut. In some disclosed examples, the pressure-operated check valve is to control an exchange of gas between the transfer cylinder and the landing gear strut based on hydraulic fluid received at the pressure-operated check valve from the aircraft hydraulics. In some disclosed examples, the walking beam linkage is coupled to the landing gear strut, the transfer cylinder, and the aircraft. In some disclosed examples, the walking beam linkage is to transmit a load to the aircraft as the landing gear strut rotates from the deployed position to the retracted position.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Example hydraulic shrink systems disclosed herein implement a transfer cylinder to shrink an aircraft landing gear during and/or in parallel with a hydraulically driven retraction of the landing gear from a deployed position to a retracted position. The shrinking of the landing gear via the transfer cylinder is dependent upon the kinematic motion associated with rotating and/or moving the landing gear from the deployed position to the retracted position. The disclosed hydraulic shrink systems shrink the landing gear in a manner that advantageously reduces (e.g., minimizes) structural loads reacted by (e.g., to be transmitted into) the aircraft, and/or operational loads of the hydraulic shrink system.

In some examples, the disclosed hydraulic shrink systems reduce structural loads to be reacted by an aircraft by providing for an exchange of pressurized gas between the landing gear and the transfer cylinder during the retraction and shrinking of the landing gear. Example walking beam linkages disclosed herein may be implemented to couple the disclosed hydraulic shrink systems to an aircraft. In some examples, the disclosed walking beam linkages enable the disclosed hydraulic shrink systems to reduce structural loads to be reacted by an aircraft by increasing a moment arm associated with retracting the landing gear. In some examples, a dynamic increase in gas pressure occurs within the landing gear of the disclosed hydraulic shrink systems in response to vertical aircraft energy absorbed during landing of the aircraft. In some examples, the disclosed hydraulic shrink systems reduce structural loads to be reacted by an aircraft by implementing a pressure-operated check valve to isolate the dynamic increase in gas pressure to the landing gear, and/or to prevent the dynamic increase in gas pressure from passing to the transfer cylinder.

Figure 1:
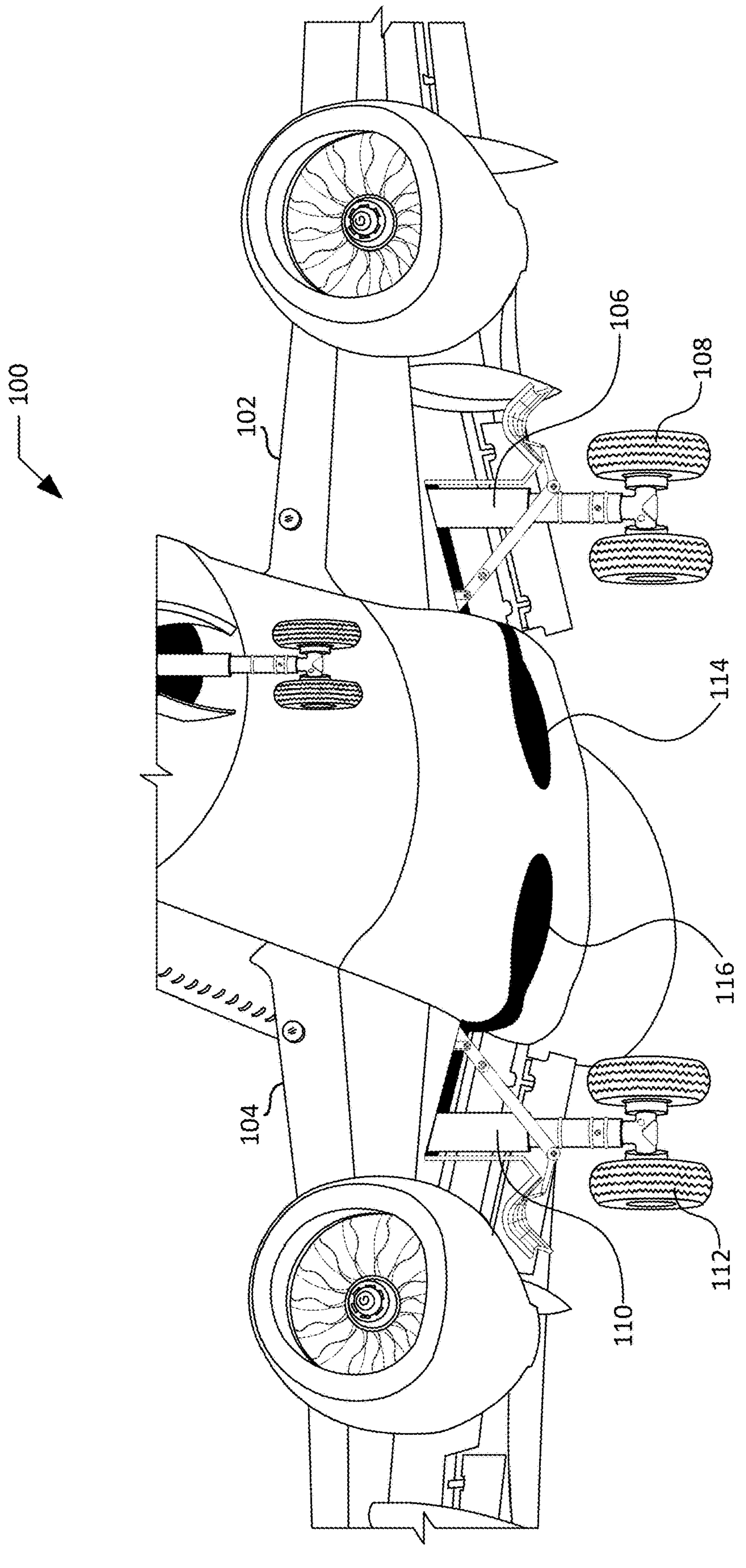
FIG. 1 illustrates an example aircraft in which example hydraulic shrink systems may be implemented in accordance with the teachings of this disclosure.

FIG. 1 illustrates an example aircraft 100 in which example hydraulic shrink systems may be implemented in accordance with the teachings of this disclosure. The aircraft 100 includes an example left wing 102 and an example right wing 104. The aircraft 100 also includes an example left main landing gear (LMLG) 106 coupled to the left wing 102 and having a first example set of wheels 108, and an example right main landing gear (RMLG) 110 coupled to the right wing 104 and having a second example set of wheels 112.

In the illustrated example of FIG. 1, the LMLG 106 and the RMLG 110 are in a deployed (e.g., downlocked) position. The LMLG 106 is movable from the deployed position shown in FIG. 1 to a retracted position in which the LMLG 106 and/or the first set of wheels 108 is/are positioned in a first example well 114 of the aircraft 100 of FIG. 1. The RMLG 110 is also movable from the deployed position shown in FIG. 1 to a retracted position in which the RMLG 110 and/or the second set of wheels 112 is/are positioned in a second example well 116 of the aircraft 100 of FIG. 1. Downlock members (e.g., downlock struts, rods, shafts, and/or links) that are respectively coupled to corresponding ones of the LMLG 106 and the RMLG 110 of FIG. 1 may be positioned and/or engaged to secure and/or lock the LMLG 106 and the RMLG 110 in the deployed position, and may be repositioned and/or disengaged to enable the LMLG 106 and the RMLG 110 to be moved from the deployed position to the retracted position. Movement of the LMLG 106 and the RMLG 110 between the deployed and retracted positions occurs via a landing gear hydraulic actuation system located within the aircraft 100 of FIG. 1. The landing gear hydraulic actuation system is operatively coupled to a controller located within the aircraft 100 of FIG. 1. The controller manages and/or controls the operation of the landing gear hydraulic actuation system.

In some examples, a landing gear lever located within the aircraft 100 of FIG. 1 (e.g., in a cockpit of the aircraft 100) is operatively coupled to the controller. Movement of the landing gear lever (e.g., via a pilot) between a down position and an up position generates corresponding positional inputs to be received by the controller to facilitate movement of the LMLG 106 and the RMLG 110 between the deployed and retracted positions described above. The landing gear lever may be moved from the down position to the up position subsequent to and/or in connection with a takeoff procedure of the aircraft 100 of FIG. 1. The landing gear lever may be moved from the up position to the down position prior to and/or in connection with a landing procedure of the aircraft 100 of FIG. 1. In some examples, operation of the hydraulic shrink systems disclosed herein may be based in part on the position of the landing gear lever.

In other examples (e.g., in examples where the aircraft 100 of FIG. 1 is an unmanned and/or autonomous aircraft), a landing gear position manager (e.g., a programmable processor) located within the aircraft 100 of FIG. 1 is operatively coupled to the controller. The landing gear position manager may be remotely programmed, commanded, set, and/or controlled to obtain, take on, and/or achieve a first state corresponding to a down position or a second state corresponding to an up position to generate corresponding positional inputs to be received by the controller to facilitate movement of the LMLG 106 and the RMLG 110 between the deployed and retracted positions described above. The landing gear position manager may be remotely programmed, commanded, and/or set to the first state corresponding to the up position subsequent to and/or in connection with a takeoff procedure of the aircraft 100 of FIG. 1. The landing gear position manager may be remotely programmed, commanded, and/or set to the second state corresponding to the down position prior to and/or in connection with a landing procedure of the aircraft 100 of FIG. 1. In some examples, operation of the hydraulic shrink systems disclosed herein may be based in part on the state and/or the corresponding position of the landing gear position manager.

Respective ones of the LMLG 106 and the RMLG 110 have a first length (e.g., an unshrunk length) when positioned in the deployed (e.g., downlocked) position shown in FIG. 1. For example, the first length of the LMLG 106 may be measured from the underside of the left wing 102 of the aircraft 100 to the bottom of the first set of wheels 108 when the LMLG 106 is positioned in the deployed position shown in FIG. 1, and the first length of the RMLG 110 may be measured from the underside of the right wing 104 of the aircraft 100 to the bottom of the second set of wheels 112 when the RMLG 110 is positioned in the deployed position shown in FIG. 1. In some disclosed examples, the first length (e.g., the unshrunk length) of the LMLG 106 and/or the RMLG 110 may exceed spatial limitations defined by the shape and/or volume of corresponding ones of the first well 114 and/or the second well 116 of the aircraft 100 of FIG. 1. In such examples, it becomes necessary to shrink (e.g., to reduce the length of) the LMLG 106 and/or the RMLG 110 from the first length to a second length (e.g., a shrunk length) that is less than the first length, and which enables the LMLG 106 and/or the RMLG 110 to fit within the spatial limitations defined by the shape and/or volume of the corresponding ones of the first well 114 and/or the second well 116 of the aircraft 100 of FIG. 1.

Shrinking and/or unshrinking of the LMLG 106 and/or the RMLG 110 of FIG. 1 may occur via the example hydraulic shrink systems disclosed herein. The LMLG 106 and/or the RMLG 110 of FIG. 1 may be shrunk (e.g. reduced in length) from the first length to the second length during and/or in parallel with moving the LMLG 106 and/or the RMLG 110 from the deployed position to the retracted position, and may be unshrunk (e.g., increased in length) from the second length to the first length during and/or in parallel with moving the LMLG 106 and/or the RMLG 110 from the retracted position to the deployed position. In some examples, the difference between the first length (e.g., the unshrunk length) and the second length (e.g., the shrunk length) of respective ones of the LMLG 106 and the RMLG 110 of FIG. 1 may be approximately nine inches. In other examples, the difference between the first length and the second length may be greater than or less than nine inches (e.g., six inches, twelve inches, etc.).

Figure 2:
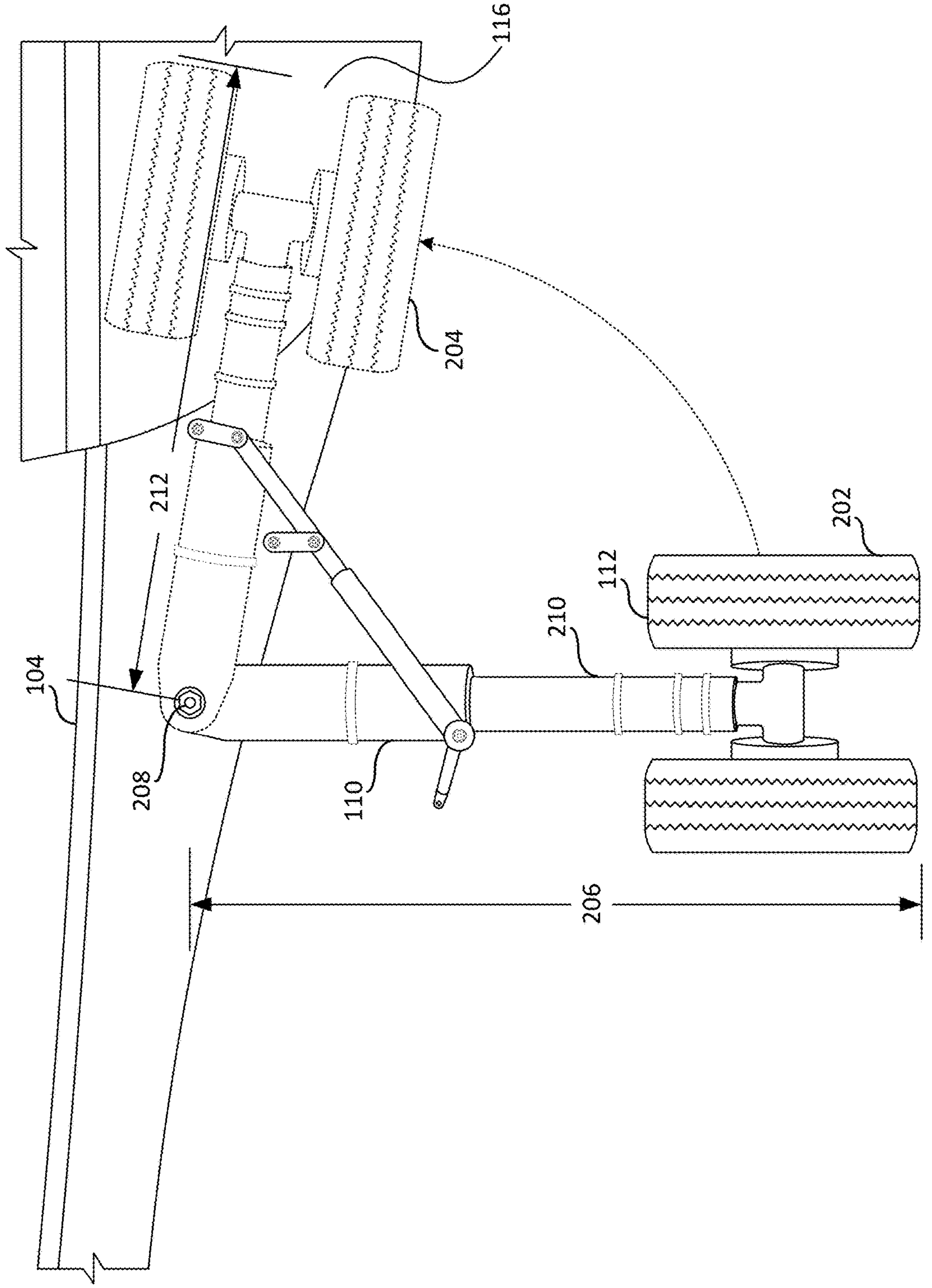
FIG. 2 illustrates the example RMLG of FIG. 1 in an example unshrunk deployed position and in an example shrunk retracted position.

FIG. 2 illustrates the example RMLG 110 of FIG. 1 in an example unshrunk deployed position 202 and in an example shrunk retracted position 204. The RMLG 110 of FIGS. 1 and 2 may be positioned in the unshrunk deployed position 202 of FIG. 2 when the second set of wheels 112 of the RMLG 110 of FIGS. 1 and 2 is not in contact with a ground surface (e.g., when the aircraft 100 of FIG. 1 is airborne). The RMLG 110 of FIGS. 1 and 2 has an example first length 206 measured from an example axis of rotation 208 of the RMLG 110 to the bottom of the second set of wheels 112 of FIGS. 1 and 2 when the RMLG 110 is in the unshrunk deployed position 202 shown in FIG. 2. The first length 206 of FIG. 2 may be associated with an example landing gear oleo strut 210 of the RMLG 110 of FIGS. 1 and 2 being uncompressed and/or extended in response to the weight of the aircraft 100 being removed from the RMLG 110 subsequent to and/or in connection with takeoff of the aircraft 100. The first length 206 of FIG. 2 may also be associated with the landing gear oleo strut 210 of the RMLG 110 of FIGS. 1 and 2 being unshrunk and deployed (e.g., from the shrunk retracted position 204 of FIG. 2) via the example hydraulic shrink systems disclosed herein.

The RMLG 110 of FIGS. 1 and 2 may be positioned in the shrunk retracted position 204 of FIG. 2 (shown in phantom) when the RMLG 110 of FIGS. 1 and 2 is shrunk and retracted into the second well 116 of FIGS. 1 and 2. The RMLG 110 of FIGS. 1 and 2 has an example second length 212 measured from the axis of rotation 208 of the RMLG 110 to the bottom of the second set of wheels 112 of FIGS. 1 and 2 when the RMLG 110 is in the shrunk retracted position 204 shown in FIG. 2. The second length 212 of FIG. 2 is less than the first length 206 of FIG. 2. In some examples, the second length 212 of FIG. 2 may be approximately nine inches less than the first length 206 of FIG. 2. In other examples, the difference between the first length 206 and the second length 212 of FIG. 2 may be greater than or less than nine inches (e.g., six inches, twelve inches, etc.). The second length 212 of FIG. 2 may be associated with the landing gear oleo strut 210 of the RMLG 110 of FIGS. 1 and 2 being shrunk and retracted (e.g., from the unshrunk deployed position 202 of FIG. 2) via the example hydraulic shrink systems disclosed herein. The RMLG 110 fits within the spatial limitations defined by the shape and/or volume of the second well 116 of FIGS. 1 and 2 when the RMLG 110 is in the shrunk retracted position 204 of FIG. 2.

Figure 3:
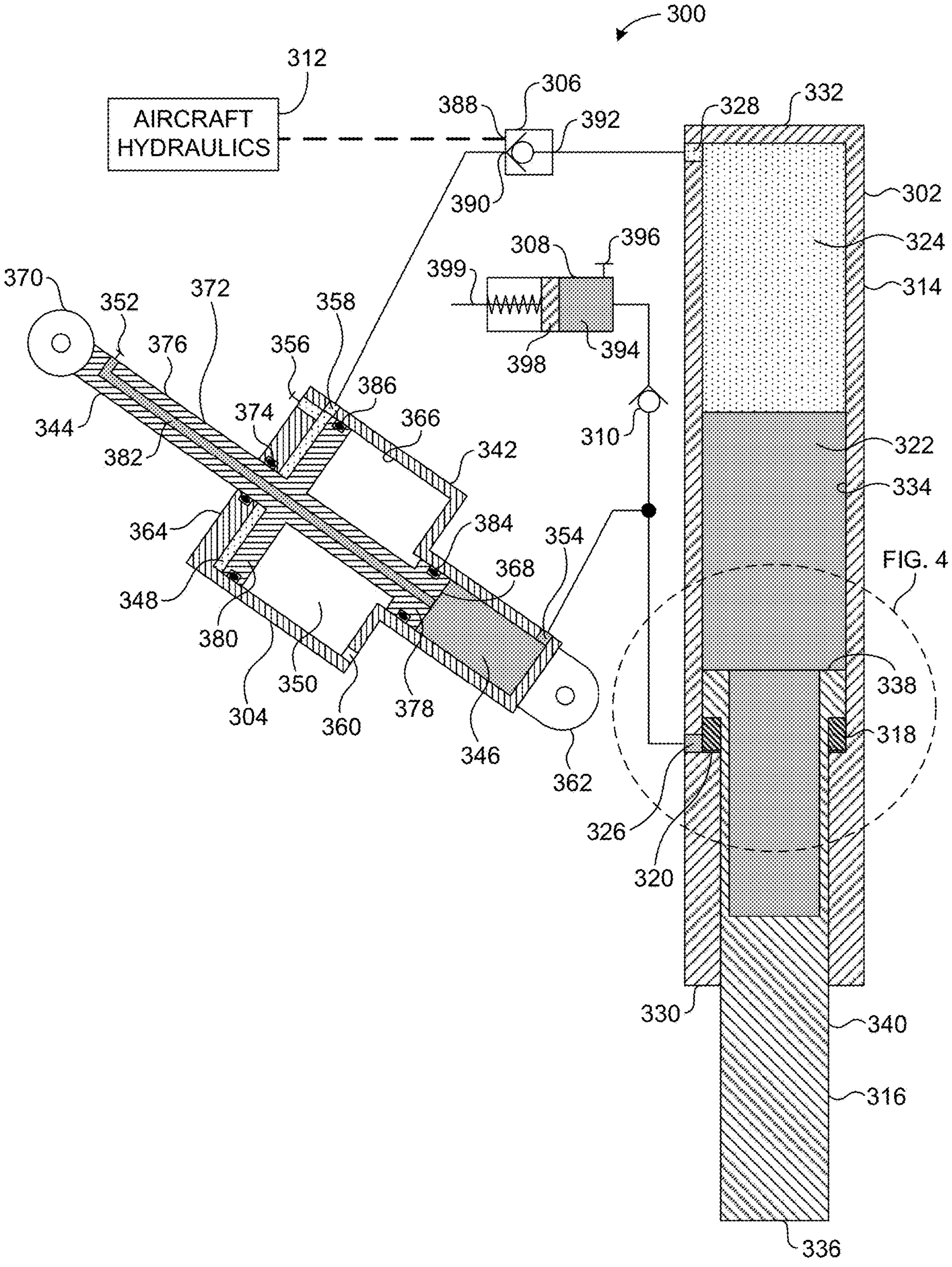
FIG. 3 is a schematic of an example hydraulic shrink system constructed in accordance with the teachings of this disclosure.

FIG. 3 is a schematic of an example hydraulic shrink system 300 constructed in accordance with the teachings of this disclosure. In the illustrated example of FIG. 3, the hydraulic shrink system 300 includes an example landing gear strut 302, an example transfer cylinder 304, an example pressure-operated check valve 306, an example compensator 308, an example compensator check valve 310, and example aircraft hydraulics 312. The landing gear strut 302 is operatively coupled to the transfer cylinder 304, the pressure-operated check valve 306, and the compensator check valve 310. The transfer cylinder 304 is operatively coupled to the landing gear strut 302, the pressure-operated check valve 306, and the compensator check valve 310. The pressure-operated check valve 306 is operatively coupled to the landing gear strut 302, the transfer cylinder 304, and the aircraft hydraulics 312. The compensator 308 is operatively coupled to the compensator check valve 310. The compensator check valve 310 is operatively coupled to the landing gear strut 302, the transfer cylinder 304, and the compensator 308. The aircraft hydraulics 312 are operatively coupled to the pressure-operated check valve 306. In some examples, the aircraft hydraulics 312 may also be operatively coupled (e.g., directly or indirectly) to the landing gear strut 302 to drive, rotate, and/or actuate the landing gear strut 302 between a deployed position and a retracted position.

In some examples, one or more of the operative coupling(s) described above may be facilitated and/or implemented via one or more rigid and/or flexible conduit(s) and/or pressure line(s) extending between various ones of the identified structures. For example, the transfer cylinder 304 of FIG. 3 may be operatively coupled to the landing gear strut 302 of FIG. 3 via one or more flexible conduit(s) structured to carry and/or convey hydraulic fluid between the transfer cylinder 304 and the landing gear strut 302. In other examples, one or more of the operative coupling(s) described above may be facilitated and/or implemented via one or more direct connection(s) between various ones of the identified structures, where the direct connection(s) do/does not include a separate conduit and/or pressure line extending between the structures.

Figure 4:
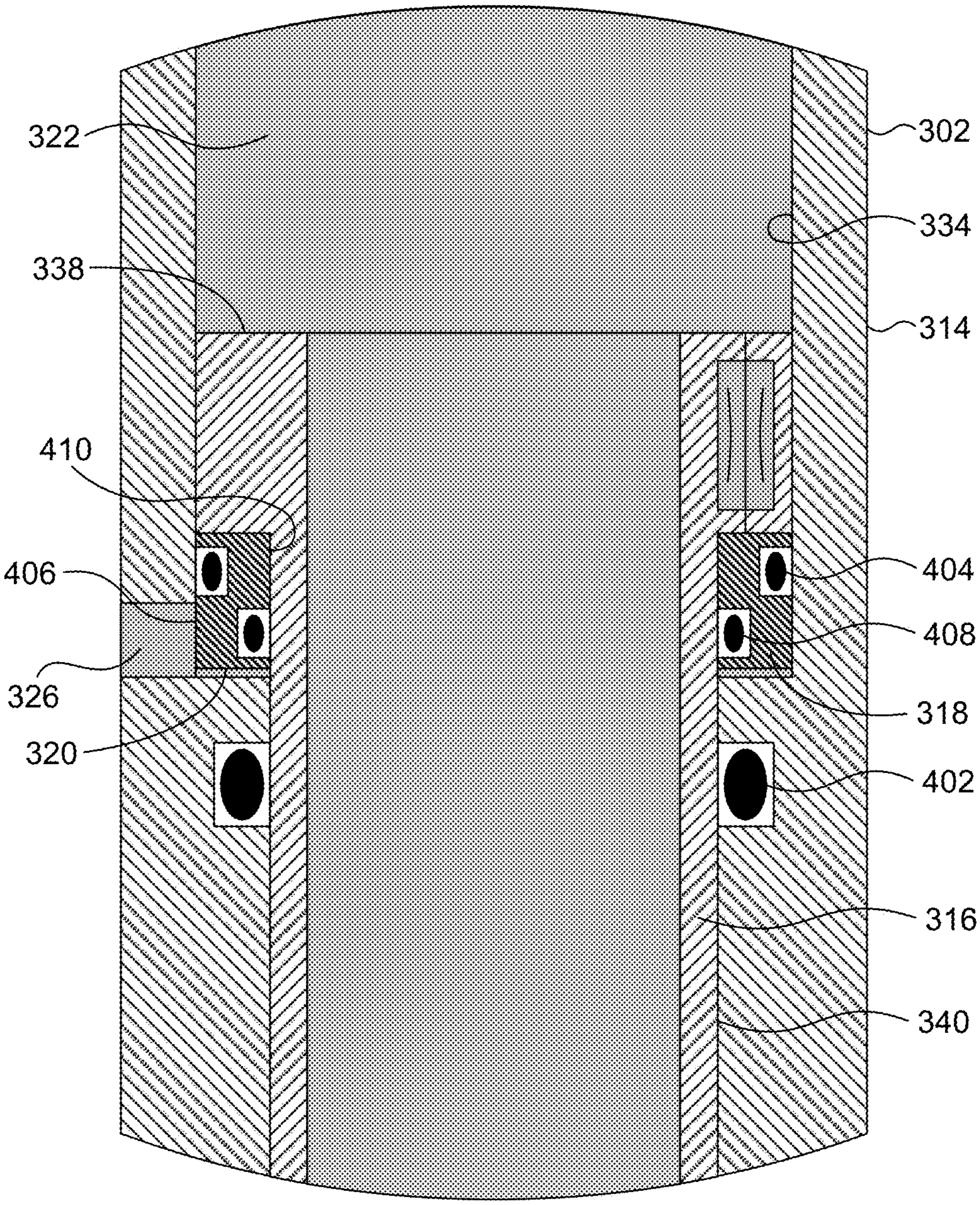
FIG. 4 is an enlarged partial cross-sectional view of the example landing gear strut of FIG. 3.
Figure 5:
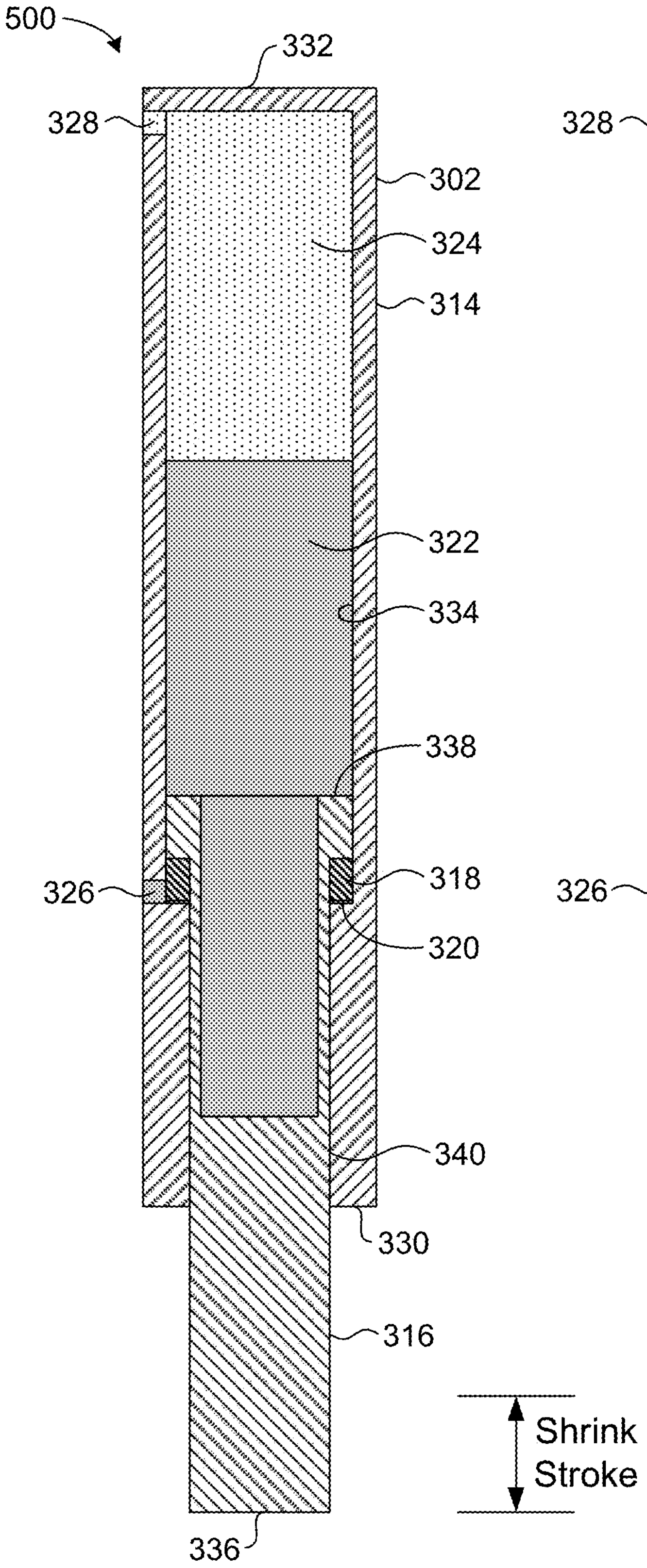
FIG. 5 is a cross-sectional view of the example landing gear strut of FIGS. 3 and 4 in an example unshrunk position.
Figure 6:
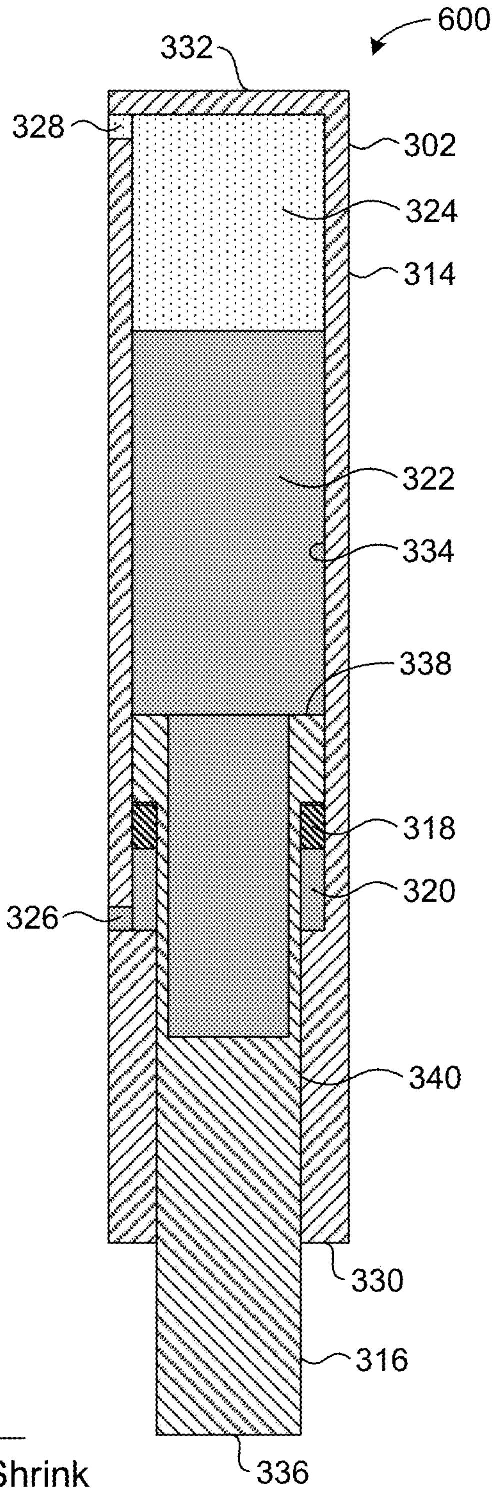
FIG. 6 is a cross-sectional view of the example landing gear strut of FIGS. 3-5 in an example shrunk position.

FIG. 4 is an enlarged partial cross-sectional view of the example landing gear strut 302 of FIG. 3. FIG. 5 is a cross-sectional view of the example landing gear strut 302 of FIGS. 3 and 4 in an example unshrunk position 500. FIG. 6 is a cross-sectional view of the example landing gear strut 302 of FIGS. 3-5 in an example shrunk position 600. The landing gear strut 302 of FIGS. 3-6 includes an example outer cylinder 314, an example inner cylinder 316, an example strut shrink piston 318, an example strut shrink volume 320, an example strut liquid volume 322, an example strut gas volume 324, an example first port 326, and an example second port 328.

The outer cylinder 314 of FIGS. 3-6 includes an example first end 330, an example second end 332 located opposite the first end 330 of the outer cylinder 314, and an example inner surface 334. The outer cylinder 314 has a fixed length generally defined as the distance between the first end 330 and the second end 332 of the outer cylinder 314. The inner cylinder 316 of FIGS. 3-6 includes an example first end 336, an example second end 338 located opposite the first end 336 of the inner cylinder 316, and an example outer surface 340 The inner cylinder 316 has a fixed length generally defined as the distance between the first end 336 and the second end 338 of the inner cylinder 316.

The inner cylinder 316 is positioned, disposed, and/or received within the outer cylinder 314 and is movable and/or slidable relative to the outer cylinder 314 between an unshrunk position (e.g., the unshrunk position 500 of FIG. 5) and a shrunk position (e.g., the shrunk position 600 of FIG. 6). In some examples, the landing gear strut 302 of FIGS. 3-6 has a first length when the inner cylinder 316 is in the unshrunk position relative to the outer cylinder 314, and a second length less than the first length when the inner cylinder 316 is in the shrunk position relative to the outer cylinder 314. The difference between the first length and the second length of the landing gear strut 302 defines and/or corresponds to a shrink stroke of the landing gear strut 302, as generally shown in FIGS. 5 and 6. In some examples, the landing gear strut 302 of FIGS. 3-6 shrinks and/or transitions from the unshrunk position to the shrunk position during, in parallel with, and/or in conjunction with the landing gear strut 302 rotating and/or moving from a deployed position (e.g., an unshrunk deployed position) to a retracted position (e.g., a shrunk retracted position). In some such examples, the shrinking of the landing gear strut 302 is dependent on and/or occurs in response to the kinematic motion associated with rotating and/or moving the landing gear strut 302 from the deployed position to the retracted position.

The strut shrink piston 318 of FIGS. 3-6 is located and/or positioned between the outer cylinder 314 and the inner cylinder 316 within the strut shrink volume 320 of FIGS. 3-6. In the illustrated example of FIGS. 3-6, the strut shrink piston 318 has an annular shape such that the strut shrink piston 318 surrounds and/or circumscribes the outer surface 340 of the inner cylinder 316 while also being positioned within the inner surface 334 of the outer cylinder 314. In the illustrated example of FIG. 4, an example first seal 402 located below the strut shrink piston 318 provides an interface and/or seal between the inner surface 334 of the outer cylinder 314 and the outer surface 340 of the inner cylinder 316. The first seal 402 prevents the strut shrink volume 320 of FIGS. 3-6 from leaking between the outer cylinder 314 and the inner cylinder 316. An example second seal 404 coupled to, carried by, and/or disposed on the strut shrink piston 318 provides an interface and/or seal between the inner surface 334 of the outer cylinder 314 and an example outer surface 406 of the strut shrink piston 318. An example third seal 408 coupled to, carried by, and/or disposed on the strut shrink piston 318 provides an interface and/or seal between the outer surface 340 of the inner cylinder 316 and an example inner surface 410 of the strut shrink piston 318. The second seal 404 and the third seal 408 isolate the strut shrink volume 320 of FIGS. 3-6 from the strut liquid volume 322 of FIGS. 3-6.

The strut shrink volume 320 of FIGS. 3-6 includes and/or is a volume of pressurized hydraulic fluid (e.g., BMS 3-32 hydraulic strut fluid) in liquid form. In the illustrated example of FIGS. 3-6, the strut shrink volume 320 is in fluid communication with the first port 326 of the landing gear strut 302. In some examples, the strut shrink volume 320 includes a volume of pressurized hydraulic fluid received from and/or to be exchanged with the transfer cylinder 304 of FIG. 3 via the first port 326 of the landing gear strut 302.

Increasing the strut shrink volume 320 of FIGS. 3-6 (e.g., increasing the volume of the pressurized hydraulic fluid of the strut shrink volume 320) causes the strut shrink piston 318 of FIGS. 3-6 to move, slide, and/or lift the inner cylinder 316 of FIGS. 3-6 relative to the outer cylinder 314 of FIGS. 3-6 away from an unshrunk position (e.g., the unshrunk position 500 of FIG. 5) and toward a shrunk position (e.g., the shrunk position 600 of FIG. 6). Decreasing the strut shrink volume 320 of FIGS. 3-6 (e.g., decreasing the volume of the pressurized hydraulic fluid of the strut shrink volume 320) causes the strut shrink piston 318 of FIGS. 3-6 to move, slide, and/or lower the inner cylinder 316 of FIGS. 3-6 relative to the outer cylinder 314 of FIGS. 3-6 away from the shrunk position (e.g., the shrunk position 600 of FIG. 6) and toward the unshrunk position (e.g., the unshrunk position 500 of FIG. 5). In the illustrated example of FIGS. 3-6, the strut shrink volume 320 has a minimum volume (e.g., a volume of approximately zero) when the inner cylinder 316 and/or, more generally, the landing gear strut 302 of FIGS. 3-6 is in the unshrunk position (e.g., the unshrunk position 500 of FIG. 5), and has a maximum volume when the inner cylinder 316 and/or, more generally, the landing gear strut 302 of FIGS. 3-6 is in the shrunk position (e.g., the shrunk position 600 of FIG. 6).

The strut liquid volume 322 of FIGS. 3-6 includes and/or is a volume of pressurized hydraulic fluid (e.g., BMS 3-32 hydraulic strut fluid) in liquid form. The strut liquid volume 322 of FIGS. 3-6 is isolated from the strut shrink volume 320 of FIGS. 3-6. Unlike the strut shrink volume 320 of FIGS. 3-6 described above, the strut liquid volume 322 of FIGS. 3-6 remains substantially constant (e.g., without a significant change in volume) as the strut shrink piston 318 moves, slides, and/or lifts the inner cylinder 316 relative to the outer cylinder 314 away from an unshrunk position (e.g., the unshrunk position 500 of FIG. 5) and toward a shrunk position (e.g., the shrunk position 600 of FIG. 6).

The strut gas volume 324 of FIGS. 3-6 includes and/or is a volume of pressurized gas (e.g., nitrogen). The strut gas volume 324 of FIGS. 3-6 is in fluid communication with the strut liquid volume 322, and is also in fluid communication with the second port 328 of the landing gear strut 302. In some examples, the strut gas volume 324 includes a volume of pressurized gas that has been received from, that is to be transferred to, and/or that is to be exchanged with a volume of pressurized gas associated with the transfer cylinder 304 of FIG. 3, as further described below. In some such examples, the strut gas volume 324 may have been received from, may be transferred to, and/or may be exchanged with the volume of gas associated with the transfer cylinder 304 via the second port 328 of the landing gear strut 302, and/or via the pressure-operated check valve 306 of FIG. 3.

Figure 7:
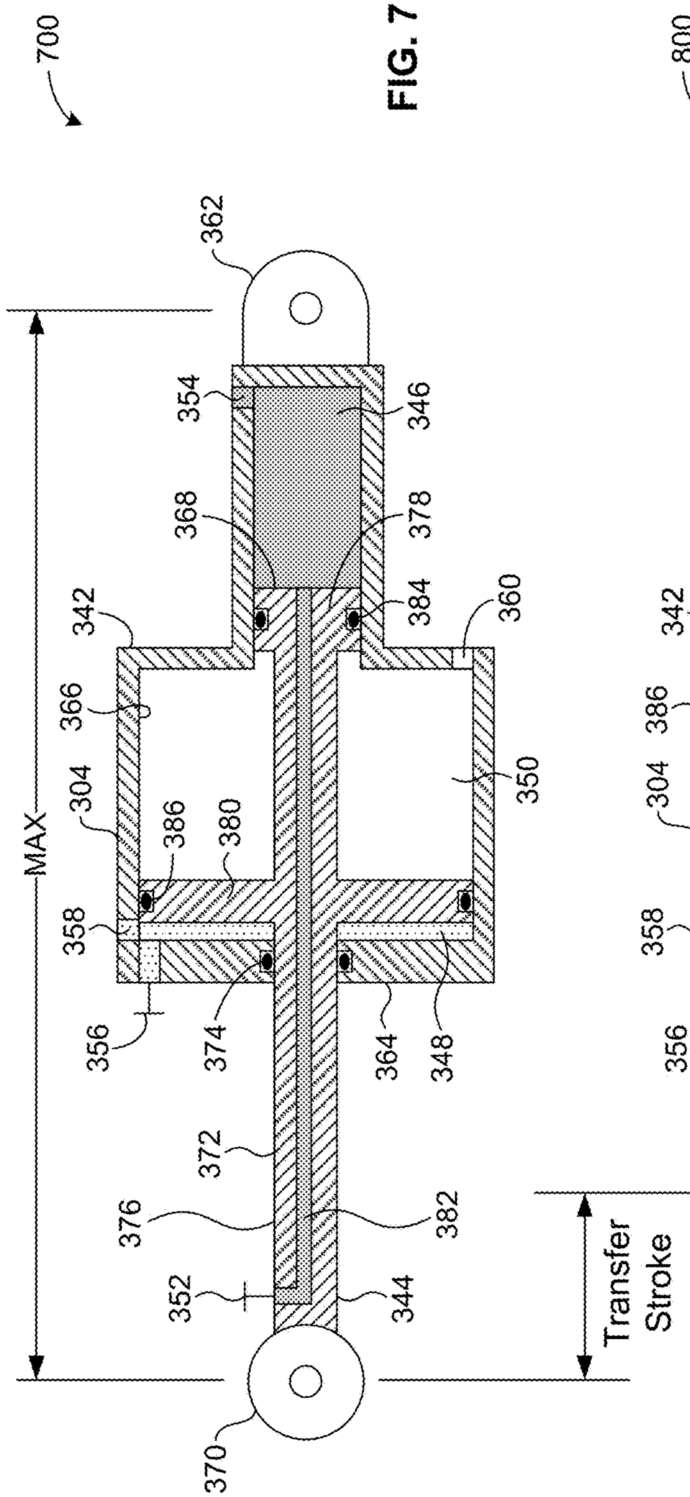
FIG. 7 is a cross-sectional view of the example transfer cylinder of FIG. 3 in an example extended position.
Figure 8:
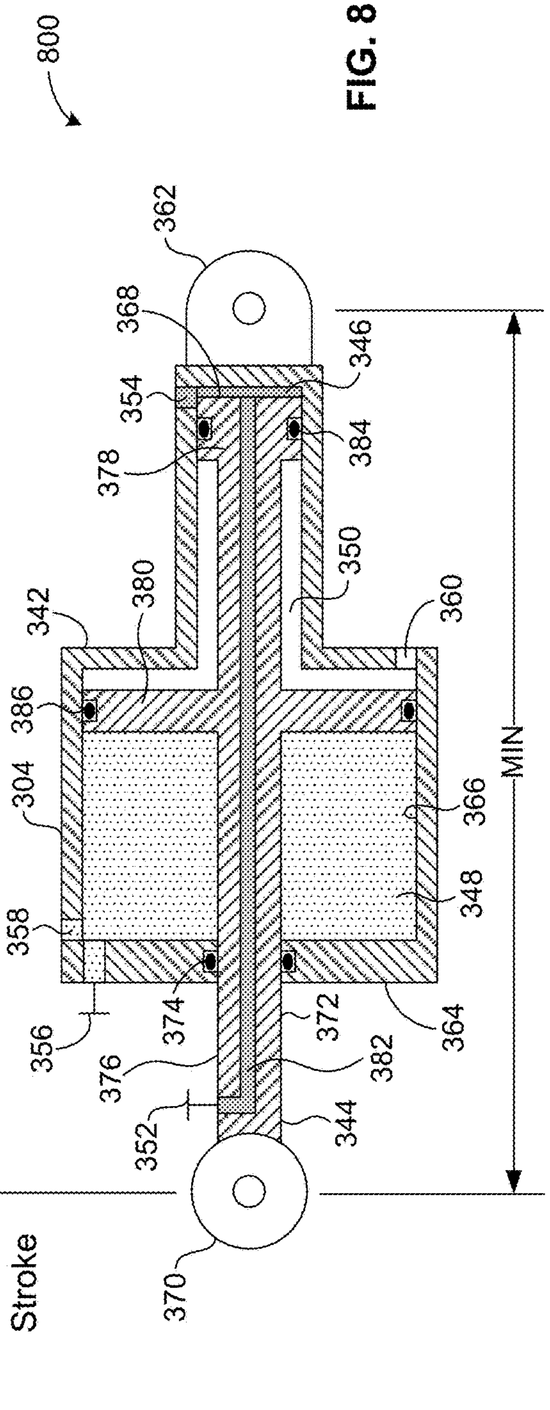
FIG. 8 is a cross-sectional view of the example transfer cylinder of FIGS. 3 and 7 in an example compressed position.

FIG. 7 is a cross-sectional view of the example transfer cylinder 304 of FIG. 3 in an example extended position 700. FIG. 8 is a cross-sectional view of the example transfer cylinder 304 of FIGS. 3 and 7 in an example compressed position 800. The transfer cylinder 304 of FIGS. 3, 7 and 8 includes an example barrel 342, an example transfer piston 344, an example cylinder shrink volume 346, an example cylinder gas volume 348, an example atmospheric gas volume 350, an example first port 352, an example second port 354, an example third port 356, an example fourth port 358, and an example fifth port 360.

The barrel 342 of FIGS. 3, 7 and 8 includes an example first end 362, an example second end 364 located opposite the first end 362 of the barrel 342, and an example inner surface 366. The barrel 342 has a fixed length generally defined as the distance between the first end 362 and the second end 364 of the barrel 342. The transfer piston 344 of FIGS. 3, 7 and 8 includes an example first end 368, an example second end 370 located opposite the first end 368 of the transfer piston 344, and an example outer surface 372. The transfer piston 344 has a fixed length generally defined as the distance between the first end 368 and the second end 370 of the transfer piston 344. An example barrel seal 374 coupled to, carried by, and/or disposed on the barrel 342 provides an interface and/or seal between the inner surface 366 of the barrel 342 and the outer surface 372 of the transfer piston 344. The barrel seal 374 prevents the cylinder gas volume 348 of FIGS. 3, 7 and 8 from leaking between the barrel 342 and the transfer piston 344.

The transfer piston 344 is positioned, disposed, and/or received within the barrel 342 and is movable and/or slidable relative to the barrel 342 between an extended position (e.g., the extended position 700 of FIG. 7) and a compressed position (e.g., the compressed position 800 of FIG. 8). In some examples, the transfer cylinder 304 of FIGS. 3, 7 and 8 has a first length when the transfer piston 344 is in the extended position relative to the barrel 342, and a second length less than the first length when the transfer piston 344 is in the compressed position relative to the barrel 342. The difference between the first length and the second length of the transfer cylinder 304 defines and/or corresponds to a transfer stroke of the transfer cylinder 304, as generally shown in FIGS. 7 and 8. In some examples, the transfer cylinder 304 of FIGS. 3, 7 and 8 compresses and/or transitions from the extended position to the compressed position during, in parallel with, and/or in conjunction with the landing gear strut 302 moving from a deployed position (e.g., an unshrunk deployed position) to a retracted position (e.g., a shrunk retracted position). In some such examples, the compressing of the transfer cylinder 304 is dependent on and/or occurs in response to the kinematic motion associated with rotating and/or moving the landing gear strut 302 from the deployed position to the retracted position.

The transfer piston 344 of FIGS. 3, 7 and 8 also includes an example shaft 376, an example first body 378, an example second body 380, and an example fluid tube 382. In the illustrated example of FIGS. 3, 7 and 8, the shaft 376, the first body 378, and the second body 380 have respective annular shapes. The shaft 376 extends between the first end 368 of the transfer piston 344 and the second end 370 of the transfer piston 344. The first body 378 is coupled to and/or integrally formed on the shaft 376 proximate the first end 368 of the transfer piston 344. The first body 378 extends radially from the shaft 376 and substantially fills the width and/or inner circumference of a first portion of the barrel 342. The second body 380 is coupled to and/or integrally formed on the shaft 376 at a location between the first end 368 of the transfer piston 344 and the second end 370 of the transfer piston 344 such that the second body 380 is spaced apart from the first body 378. The second body 380 extends radially from the shaft 376 and substantially fills the width and/or inner circumference of a second portion of the barrel 342. As shown in FIGS. 3, 7 and 8, the diameter of the second body 380 is greater than the diameter of the first body 378.

In the illustrated example of FIGS. 3, 7 and 8, the first body 378 of the transfer piston 344 is positioned within the barrel 342 between the cylinder shrink volume 346 and the atmospheric gas volume 350. An example first body seal 384 coupled to, carried by, and/or disposed on the first body 378 of the transfer piston 344 provides an interface and/or seal between the first body 378 of the transfer piston 344 and the inner surface 366 of the barrel 342. The first body seal 384 isolates the cylinder shrink volume 346 of FIGS. 3, 7 and 8 from the atmospheric gas volume 350 of FIGS. 3, 7 and 8. The second body 380 of the transfer piston 344 is positioned within the barrel 342 between the cylinder gas volume 348 and the atmospheric gas volume 350. An example second body seal 386 coupled to, carried by, and/or disposed on the second body 380 of the transfer piston 344 provides an interface and/or seal between the second body 380 of the transfer piston 344 and the inner surface 366 of the barrel 342. The second body seal 386 isolates the cylinder gas volume 348 of FIGS. 3, 7 and 8 from the atmospheric gas volume 350 of FIGS. 3, 7 and 8.

In some examples, the second body 380 of the transfer piston 344 is sized such that pressurized gas is exchanged between the strut gas volume 324 and the cylinder gas volume 348 at a constant gas pressure, thereby reducing (e.g., minimizing) the hydraulic pressure and/or load to be applied to the strut shrink piston 318 to move, slide, and/or lift the inner cylinder 316 of FIGS. 3-6 relative to the outer cylinder 314 of FIGS. 3-6 away from an unshrunk position (e.g., the unshrunk position 500 of FIG. 5) and toward a shrunk position (e.g., the shrunk position 600 of FIG. 6). Reducing the hydraulic pressure and/or load to be applied to the strut shrink piston 318 to move, slide, and/or lift the inner cylinder 316 relative to the outer cylinder 314 advantageously reduces (e.g., minimizes) the load to be exerted by the transfer cylinder 304 into a wing-to-side-of-body area of the aircraft during retraction and shrinking of the landing gear strut 302.

The fluid tube 382 is located within the shaft 376 of the transfer piston 344 and extends substantially along the length thereof such that the fluid tube 382 passes through the first body 378 and the second body 380 of the transfer piston 344. In the illustrated example of FIGS. 3, 7 and 8, the fluid tube 382 is in fluid communication with the first port 352 of the transfer cylinder 304 and is further in fluid communication with the cylinder shrink volume 346 of the transfer cylinder 304. In some examples, the fluid tube 382 includes a volume of pressurized hydraulic fluid received from the first port 352 of the transfer cylinder 304. In the illustrated example of FIGS. 3, 7 and 8, the first port 352 of the transfer cylinder 304 is a fill and/or servicing port for adding and/or removing pressurized hydraulic fluid to and/or from the fluid tube 382 and/or the cylinder shrink volume 346.

The cylinder shrink volume 346 of FIGS. 3, 7 and 8 includes and/or is a volume of pressurized hydraulic fluid (e.g., BMS 3-32 hydraulic strut fluid) in liquid form. The cylinder shrink volume 346 is isolated from the atmospheric gas volume 350 via the first body 378 of the transfer piston 344 of FIGS. 3, 7 and 8 described above. In the illustrated example of FIGS. 3, 7 and 8, the cylinder shrink volume 346 is in fluid communication with the second port 354 of the transfer cylinder 304. In some examples, the cylinder shrink volume 346 includes a volume of pressurized hydraulic fluid to be transferred to and/or exchanged with the strut shrink volume 320 of the landing gear strut 302 of FIGS. 3-6 via the second port 354 of the transfer cylinder 304 and via the first port 326 of the landing gear strut 302.

In the illustrated example of FIGS. 3, 7 and 8, the cylinder shrink volume 346 has a maximum volume when the transfer cylinder 304 is in an extended position (e.g., the extended position 700 of FIG. 7) and/or when the landing gear strut 302 of FIGS. 3-6 is in an unshrunk position (e.g., the unshrunk position 500 of FIG. 5), and has a minimum volume when the transfer cylinder 304 is in a compressed position (e.g., the compressed position 800 of FIG. 8) and/or when the landing gear strut 302 of FIGS. 3-6 is in a shrunk position (e.g., the shrunk position 600 of FIG. 6). The cylinder shrink volume 346 of FIGS. 3, 7 and 8 decreases in response to the transfer piston 344 moving and/or sliding away from an extended position (e.g., the extended position 700 of FIG. 7) and toward a compressed position (e.g., the compressed position 800 of FIG. 8), as may occur in conjunction with actuating the landing gear strut 302 of FIGS. 3-6 from a deployed position (e.g., an unshrunk deployed position) to a retracted position (e.g., a shrunk retracted position). Decreasing the cylinder shrink volume 346 of FIGS. 3, 7 and 8 (e.g., decreasing the volume of the pressurized hydraulic fluid of the cylinder shrink volume 346) increases the strut shrink volume 320 of FIGS. 3-6. Decreasing the strut shrink volume 320 of FIGS. 3-6 (e.g., decreasing the volume of the pressurized hydraulic fluid of the strut shrink volume 320) increases the cylinder shrink volume 346 of FIGS. 3, 7 and 8.

The cylinder gas volume 348 of FIGS. 3, 7 and 8 includes and/or is a volume of pressurized gas (e.g., nitrogen). The cylinder gas volume 348 is isolated from the atmospheric gas volume 350 via the second body 380 of the transfer piston 344 of FIGS. 3, 7 and 8 described above. In the illustrated example of FIGS. 3, 7 and 8, the cylinder gas volume 348 is in fluid communication with the third port 356 of the transfer cylinder 304. In some examples, the cylinder gas volume 348 includes a volume of pressurized gas received from the third port 356 of the transfer cylinder 304. In the illustrated example of FIGS. 3, 7 and 8, the third port 356 of the transfer cylinder 304 is a fill and/or bleed port for adding and/or removing pressurized gas to and/or from the cylinder gas volume 348. In the illustrated example of FIGS. 3, 7 and 8, the cylinder gas volume 348 is also in fluid communication with the fourth port 358 of the transfer cylinder 304. In some examples, the cylinder gas volume 348 includes a volume of pressurized gas to be transferred to and/or exchanged with the strut gas volume 324 of the landing gear strut 302 of FIGS. 3-6 via the fourth port 358 of the transfer cylinder 304 and via the second port 328 of the landing gear strut 302, as further described below.

In the illustrated example of FIGS. 3, 7 and 8, the cylinder gas volume 348 has a minimum volume when the transfer cylinder 304 is in an extended position (e.g., the extended position 700 of FIG. 7) and/or when the landing gear strut 302 of FIGS. 3-6 is in an unshrunk position (e.g., the unshrunk position 500 of FIG. 5), and has a maximum volume when the transfer cylinder 304 is in a compressed position (e.g., the compressed position 800 of FIG. 8) and/or when the landing gear strut 302 of FIGS. 3-6 is in a shrunk position (e.g., the shrunk position 600 of FIG. 6). The cylinder gas volume 348 of FIGS. 3, 7 and 8 increases in response to the transfer piston 344 moving and/or sliding away from an extended position (e.g., the extended position 700 of FIG. 7) and toward a compressed position (e.g., the compressed position 800 of FIG. 8), as may occur in conjunction with actuating the landing gear strut 302 of FIGS. 3-6 from a deployed position (e.g., an unshrunk deployed position) to a retracted position (e.g., a shrunk retracted position). Increasing the cylinder gas volume 348 of FIGS. 3, 7 and 8 (e.g., increasing the volume of the pressurized gas of the cylinder gas volume 348) decreases the cylinder shrink volume 346 of FIGS. 3, 7 and 8. Increasing the cylinder shrink volume 346 of FIGS. 3, 7 and 8 (e.g., increasing the volume of the pressurized hydraulic fluid of the cylinder shrink volume 346) decreases the cylinder gas volume 348 of FIGS. 3, 7 and 8.

The atmospheric gas volume 350 of FIGS. 3, 7 and 8 includes and/or is a volume of atmospheric gas (e.g., air). The atmospheric gas volume 350 is isolated from the cylinder shrink volume 346 via the first body 378 of the transfer piston 344 of FIGS. 3, 7 and 8, and is isolated from the cylinder gas volume 348 via the second body 380 of the transfer piston 344 of FIGS. 3, 7 and 8. In the illustrated example of FIGS. 3, 7 and 8, the atmospheric gas volume 350 is in fluid communication with the fifth port 360 of the transfer cylinder 304. In some examples, the atmospheric gas volume includes a volume of atmospheric gas received from the fifth port 360 of the transfer cylinder 304. In the illustrated example of FIGS. 3, 7 and 8, the fifth port 360 of the transfer cylinder 304 is an exchange port for adding and/or removing atmospheric gas to and/or from the atmospheric gas volume 350. In some examples, leakage of hydraulic fluid from the fifth port 360 of the transfer cylinder 304 may indicate a failure of the first body seal 384 described above.

In the illustrated example of FIGS. 3, 7 and 8, the atmospheric gas volume 350 has a maximum volume when the transfer cylinder 304 is in an extended position (e.g., the extended position 700 of FIG. 7) and/or when the landing gear strut 302 of FIGS. 3-6 is in an unshrunk position (e.g., the unshrunk position 500 of FIG. 5), and has a minimum volume when the transfer cylinder 304 is in a compressed position (e.g., the compressed position 800 of FIG. 8) and/or when the landing gear strut 302 of FIGS. 3-6 is in a shrunk position (e.g., the shrunk position 600 of FIG. 6). The atmospheric gas volume 350 of FIGS. 3, 7 and 8 decreases in response to the transfer piston 344 moving and/or sliding away from an extended position (e.g., the extended position 700 of FIG. 7) and toward a compressed position (e.g., the compressed position 800 of FIG. 8), as may occur in conjunction with actuating the landing gear strut 302 of FIGS. 3-6 from a deployed position (e.g., an unshrunk deployed position) to a retracted position (e.g., a shrunk retracted position). Decreasing the atmospheric gas volume 350 of FIGS. 3, 7 and 8 decreases the cylinder shrink volume 346 of FIGS. 3, 7 and 8. Increasing the cylinder shrink volume 346 of FIGS. 3, 7 and 8 increases the atmospheric gas volume 350 of FIGS. 3, 7 and 8.

The pressure-operated check valve 306 of FIG. 3 includes an example first port 388, an example second port 390, and an example third port 392. In the illustrated example of FIG. 3, the first port 388 of the pressure-operated check valve 306 is in fluid communication with the aircraft hydraulics 312 of FIG. 3, the second port 390 of the pressure-operated check valve 306 is in fluid communication with the transfer cylinder 304 of FIGS. 3, 7 and 8, and the third port 392 of the pressure-operated check valve 306 is in fluid communication with the landing gear strut 302 of FIGS. 3-6. The pressure-operated check valve 306 may be actuated from a closed position to an open position in response to a pressurized supply of hydraulic fluid received at the first port 388 of the pressure-operated check valve 306 from the aircraft hydraulics 312 of FIG. 3. In some examples, the pressure-operated check valve 306 of FIG. 3 may be actuated to an open position during shrinking of the inner cylinder 316 of the landing gear strut 302 relative to the outer cylinder 314 of the landing gear strut 302. When the pressure-operated check valve 306 of FIG. 3 is in the open position (e.g., when pressurized hydraulic fluid is received at the first port 388 of the pressure-operated check valve 306), the strut gas volume 324 of the landing gear strut 302 of FIGS. 3-6 is able to be transferred to and/or exchanged with the cylinder gas volume 348 of the transfer cylinder 304 of FIGS. 3, 7 and 8.

For example, when the pressure-operated check valve 306 of FIG. 3 is in the open position during the shrinking of the inner cylinder 316 of the landing gear strut 302 relative to the outer cylinder 314 of the landing gear strut 302, pressurized gas from the strut gas volume 324 of the landing gear strut 302 may pass from the second port 328 of the landing gear strut 302, through the third port 392 and the second port 390 of the pressure-operated check valve 306, through the fourth port 358 of the transfer cylinder 304, and into the cylinder gas volume 348 of the transfer cylinder 304. During the unshrinking of the inner cylinder 316 of the landing gear strut 302 relative to the outer cylinder 314 of the landing gear strut 302, pressurized gas from the cylinder gas volume 348 of the transfer cylinder 304 may pass from the fourth port 358 of the transfer cylinder 304, through the second port 390 and the third port 392 of the pressure-operated check valve 306, through the second port 328 of the landing gear strut 302, and into the strut gas volume 324 of the landing gear strut 302.

In some examples, the pressure-operated check valve 306 of FIG. 3 may be actuated to and/or maintained in a closed position during landing of an aircraft implementing the hydraulic shrink system 300 of FIG. 3 to provide normal dynamic functions associated with the landing gear strut 302 (e.g., as would be the case for a conventional landing gear strut lacking a shrink function). When the pressure-operated check valve 306 of FIG. 3 is in the closed position (e.g., when pressurized hydraulic fluid is not received at the first port 388 of the pressure-operated check valve 306), pressurized gas from the strut gas volume 324 of the landing gear strut 302 of FIGS. 3-6 is blocked and/or prevented from being transferred to and/or exchanged with the cylinder gas volume 348 of the transfer cylinder 304 of FIGS. 3, 7 and 8. In some examples, a dynamic increase in gas pressure occurs within the cylinder gas volume 324 of the landing gear strut 302 in response to vertical aircraft energy absorbed during landing of the aircraft. In some examples, the pressure-operated check valve 306 isolates the dynamic increase in gas pressure to the landing gear strut 302, and/or prevents the dynamic increase in gas pressure from passing to the transfer cylinder 304, thereby reducing the structural loads to be transmitted into a wing-to-side-of-body area of the aircraft during landing.

The compensator 308 of FIG. 3 includes pressurized hydraulic fluid to be supplied, delivered, and/or provided to the strut shrink volume 320 of the landing gear strut 302 of FIG. 3, and/or to the cylinder shrink volume 346 of the transfer cylinder 304 of FIG. 3. In some examples, the pressurized hydraulic fluid maintained and/or held in the compensator 308 is to replace and/or compensate for pressurized hydraulic fluid that may be leaked from and/or otherwise lost from the strut shrink volume 320 and/or the cylinder shrink volume 346. The compensator 308 of FIG. 3 includes an example compensator shrink volume 394, an example port 396, and an example spring-operated compensator piston 398.

The compensator shrink volume 394 of FIG. 3 includes and/or is a volume of pressurized hydraulic fluid (e.g., BMS 3-32 hydraulic strut fluid) in liquid form. In the illustrated example of FIG. 3, the compensator shrink volume 394 is in fluid communication with the port 396 of the compensator 308 and is further in fluid communication with the compensator check valve 310. In some examples, the compensator shrink volume 394 includes a volume of pressurized hydraulic fluid received from the port 396 of the compensator 308. In the illustrated example of FIG. 3, the port 396 of the compensator 308 is a fill and/or servicing port for adding and/or removing pressurized hydraulic fluid to and/or from the compensator shrink volume 394.

The spring-operated compensator piston 398 of FIG. 3 biases the pressurized hydraulic fluid contained in the compensator shrink volume 394 to flow from the compensator 308 to the compensator check valve 310. In addition to being in fluid communication with the compensator shrink volume 394 of the compensator 308, the compensator check valve 310 of FIG. 3 is also in fluid communication with both the strut shrink volume 320 of the landing gear strut 302 and the cylinder shrink volume 346 of the transfer cylinder 304 of FIG. 3. Pressurized hydraulic fluid that passes from the compensator shrink volume 394 of the compensator 308 through the compensator check valve 310 is accordingly supplied, delivered, and/or provided to the strut shrink volume 320 of the landing gear strut 302, and/or to the cylinder shrink volume 346 of the transfer cylinder 304.

In the illustrated example of FIG. 3, the spring-operated compensator piston 398 includes an example indicator 399 (e.g., a shaft of the spring-operated compensator piston 398) to indicate an extent to which pressurized hydraulic fluid has been lost from the compensator shrink volume 394 of the compensator 308, from the strut shrink volume 320 of the landing gear strut 302, and/or from the cylinder shrink volume 346 of the transfer cylinder 304. For example, the indicator 399 may protrude a first length from the compensator 308 when the compensator shrink volume 394 of the compensator 308 is full (e.g., not in need of refilling and/or servicing), and may protrude a second length from the compensator 308 less than the first length when the compensator shrink volume 394 of the compensator 308 is empty (e.g., in need of refilling and/or servicing).

The aircraft hydraulics 312 of FIG. 3 control the above-described functions and/or operations of the hydraulic shrink system 300 of FIG. 3 associated with shrinking and/or unshrinking the inner cylinder 316 of the landing gear strut 302 relative to the outer cylinder 314 of the landing gear strut 302. The aircraft hydraulics 312 include a supply pressure source to supply, deliver, and/or provide pressurized hydraulic fluid to the pressure-operated check valve 306 of FIG. 3. In some examples, the supply pressure source of the aircraft hydraulics 312 may also supply, deliver, and/or provide pressurized hydraulic fluid to rotate and/or retract the landing gear strut 302 of FIG. 3 from a deployed position to a retracted position. In some examples, the pressure-operated check valve 306 of FIG. 3 may be hydraulically actuated via the aircraft hydraulics 312 during, in parallel with, and/or in conjunction with the landing gear strut 302 of FIG. 3 being hydraulically rotated via the aircraft hydraulics 312.

In some examples, the supply pressure source and/or, more generally, the aircraft hydraulics 312 of FIG. 3 may be actuated based on a selected position (e.g., an up position or a down position) of a landing gear lever that is operatively coupled to the aircraft hydraulics 312, and/or operatively coupled to a controller that controls the aircraft hydraulics 312. For example, the landing gear lever may be moved to an up position shortly after an aircraft becomes airborne following takeoff. In response to the landing gear lever being moved to the up position, the aircraft hydraulics 312 of FIG. 3 may be commanded to hydraulically rotate the landing gear strut 302 of FIGS. 3-6 from the deployed position to the retracted position. In conjunction with the aircraft hydraulics 312 hydraulically rotating the landing gear strut 302 from the deployed position to the retracted position, the aircraft hydraulics 312 may concurrently be commanded to hydraulically actuate the pressure-operated check valve 306 of FIG. 3 from a closed position to an open position. As another example, the landing gear lever may be moved to a down position in preparation for landing the aircraft. In response to the landing gear lever being moved to the down position, the aircraft hydraulics 312 of FIG. 3 may be commanded to hydraulically rotate the landing gear strut 302 of FIGS. 3-6 from the retracted position to the deployed position. If hydraulic power is unavailable, the landing gear strut 302 may alternatively be rotated from the retracted position to the deployed position via the dead weight of the landing gear strut 302 and the aircraft structures (e.g., wheels, etc.) that may be coupled to the landing gear strut 302.

Figure 9:
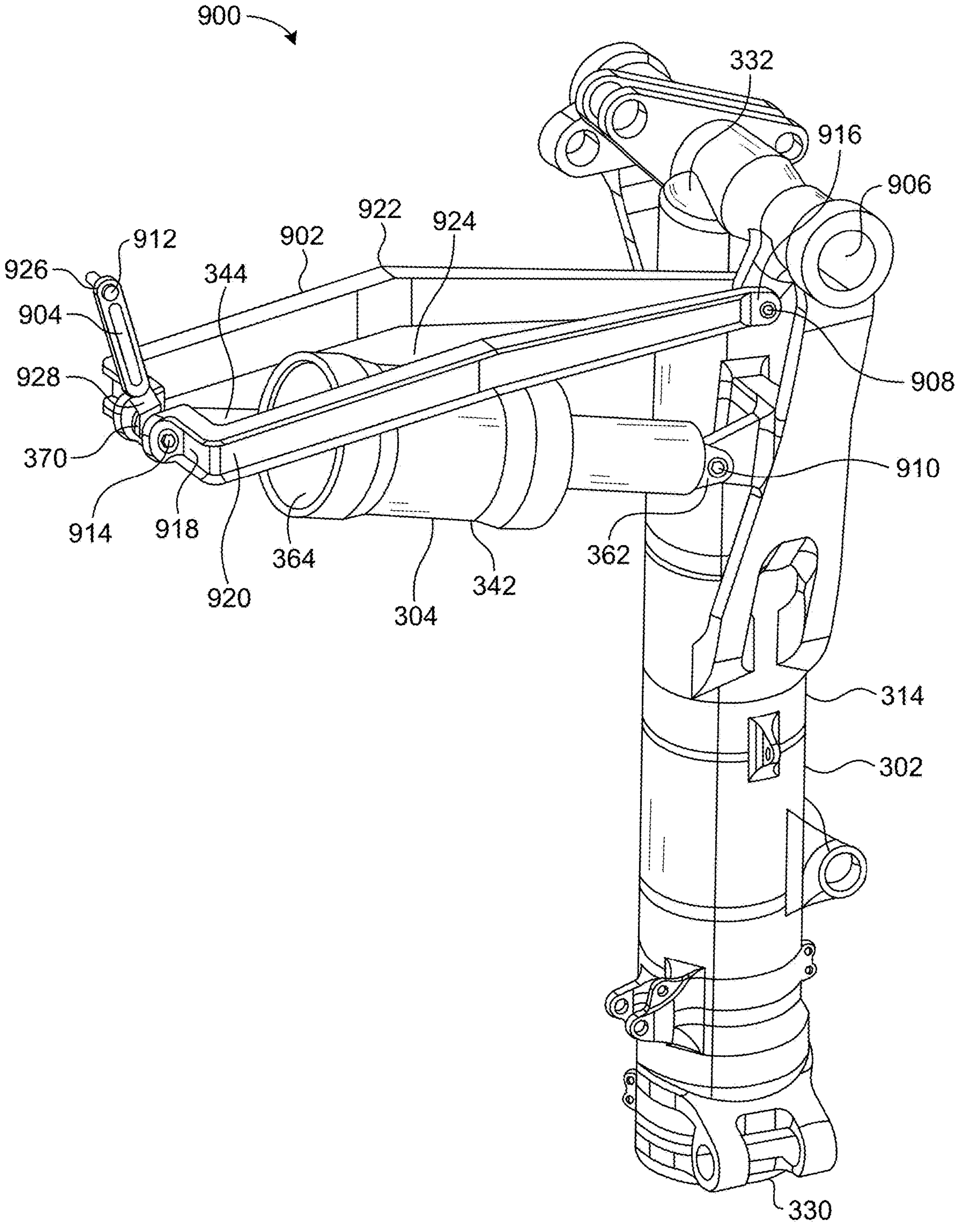
FIG. 9 illustrates an example walking beam linkage for implementing the example hydraulic shrink system of FIG. 3.

FIG. 9 illustrates an example walking beam linkage 900 for implementing the example hydraulic shrink system 300 of FIG. 3. In the illustrated example of FIG. 9, the walking beam linkage 900 includes the landing gear strut 302 of FIGS. 3-6 and the transfer cylinder 304 of FIGS. 3, 7 and 8. Although not shown in FIG. 9, the pressure-operated check valve 306, the compensator 308, the compensator check valve 310, and the aircraft hydraulics 312 may also be operatively coupled to the landing gear strut 302, the transfer cylinder 304, and/or the walking beam linkage 900 of FIG. 9. The walking beam linkage 900 of FIG. 9 further includes an example walking beam 902, an example hanger link 904, an example first joint 906, an example second joint 908, an example third joint 910, an example fourth joint 912, and an example fifth joint 914.

In the illustrated example of FIG. 9, the respective lengths of the outer cylinder 314 of the landing gear strut 302, the walking beam 902, and the hanger link 904 are fixed. The length of the transfer cylinder 304 is variable between an extended position and a compressed position, as described above in connection with FIGS. 3, 7 and 8. The respective locations of the first joint 906 and the fourth joint 912 are spatially fixed relative to an aircraft wing and/or an aircraft body to which the walking beam linkage 900 may be coupled, while the respective locations of the second joint 908, the third joint 910, and the fifth joint 914 are movable in space relative to the aircraft wing.

In the illustrated example of FIG. 9, the second end 332 of the outer cylinder 314 of the landing gear strut 302 is structured to be rotatably coupled to an aircraft wing via the first joint 906. The outer cylinder 314 may rotate and/or pivot about the first joint 906 in conjunction with the landing gear strut 302 rotating and/or moving from a deployed position (e.g., an unshrunk deployed position) to a retracted position (e.g., a shrunk retracted position). The shrinking of the landing gear strut 302 is dependent on and/or occurs in response to the kinematic motion of the walking beam linkage 900 of FIG. 9 associated with rotating and/or moving the landing gear strut 302 from the deployed position to the retracted position.

The walking beam 902 of FIG. 9 includes an example first end 916, an example second end 918 located opposite the first end 916 of the walking beam 902, an example first arm 920 extending between the first end 916 and the second end 918 of the walking beam 902, and an example second arm 922 extending between the first end 916 and the second end 918 of the walking beam 902 and separated from the first arm 920 of the walking beam 902 by an example gap 924. In the illustrated example of FIG. 9, the first end 916 of the walking beam 902 is rotatably coupled to the outer cylinder 314 of the landing gear strut 302 via the second joint 908. The walking beam 902 may rotate and/or pivot about the second joint 908 in conjunction with the landing gear strut 302 moving from a deployed position (e.g., an unshrunk deployed position) to a retracted position (e.g., a shrunk retracted position).

In the illustrated example of FIG. 9, the transfer cylinder 304 includes the barrel 342 and the transfer piston 344 described above in connection with FIGS. 3, 7 and 8. In the illustrated example of FIG. 9, the first end 362 of the barrel 342 of the transfer cylinder 304 (e.g., a first end of the transfer cylinder 304) is rotatably coupled to the outer cylinder 314 of the landing gear strut 302 via the third joint 910. The transfer cylinder 304 may rotate and/or pivot about the third joint 910 in conjunction with the landing gear strut 302 moving from a deployed position (e.g., an unshrunk deployed position) to a retracted position (e.g., a shrunk retracted position). In some examples, the barrel 342, the transfer piston 344, and/or, more generally, the transfer cylinder 304 may rotate and/or pivot through the gap 924 formed between the first arm 920 and the second arm 922 of the walking beam 902 as the transfer cylinder 304 rotates and/or pivots about the third joint 910.

The hanger link 904 of FIG. 9 includes an example first end 926 and an example second end 928 located opposite the first end 926 of the hanger link 904. In the illustrated example of FIG. 9, the first end 926 of the hanger link 904 is structured to be rotatably coupled to a wing-to-side-of-body area of an aircraft via the fourth joint 912. The hanger link 904 may rotate and/or pivot about the fourth joint 912 in conjunction with the landing gear strut 302 moving from a deployed position (e.g., an unshrunk deployed position) to a retracted position (e.g., a shrunk retracted position). In the illustrated example of FIG. 9, the second end 918 of the walking beam 902 and the second end 370 of the transfer piston 344 of the transfer cylinder 304 are respectively rotatably coupled to the second end 928 of the hanger link 904 via the fifth joint 914. The walking beam 902, the transfer cylinder 304, and the hanger link 904 may respectively rotate and/or pivot about the fifth joint 914 (e.g., relative to one another) in conjunction with the landing gear strut 302 moving from a deployed position (e.g., an unshrunk deployed position) to a retracted position (e.g., a shrunk retracted position).

The walking beam linkage 900 of FIG. 9 described above may be implemented to couple the hydraulic shrink system 300 of FIG. 3 to an aircraft. As further described below in connection with FIG. 10, the walking beam linkage 900 of FIG. 9 reduces structural loads to be reacted by (e.g., to be transmitted into) the aircraft wing-to-side-of-body area of an aircraft by increasing a moment arm associated with retracting the landing gear strut 302 of the hydraulic shrink system 300.

Figure 10:
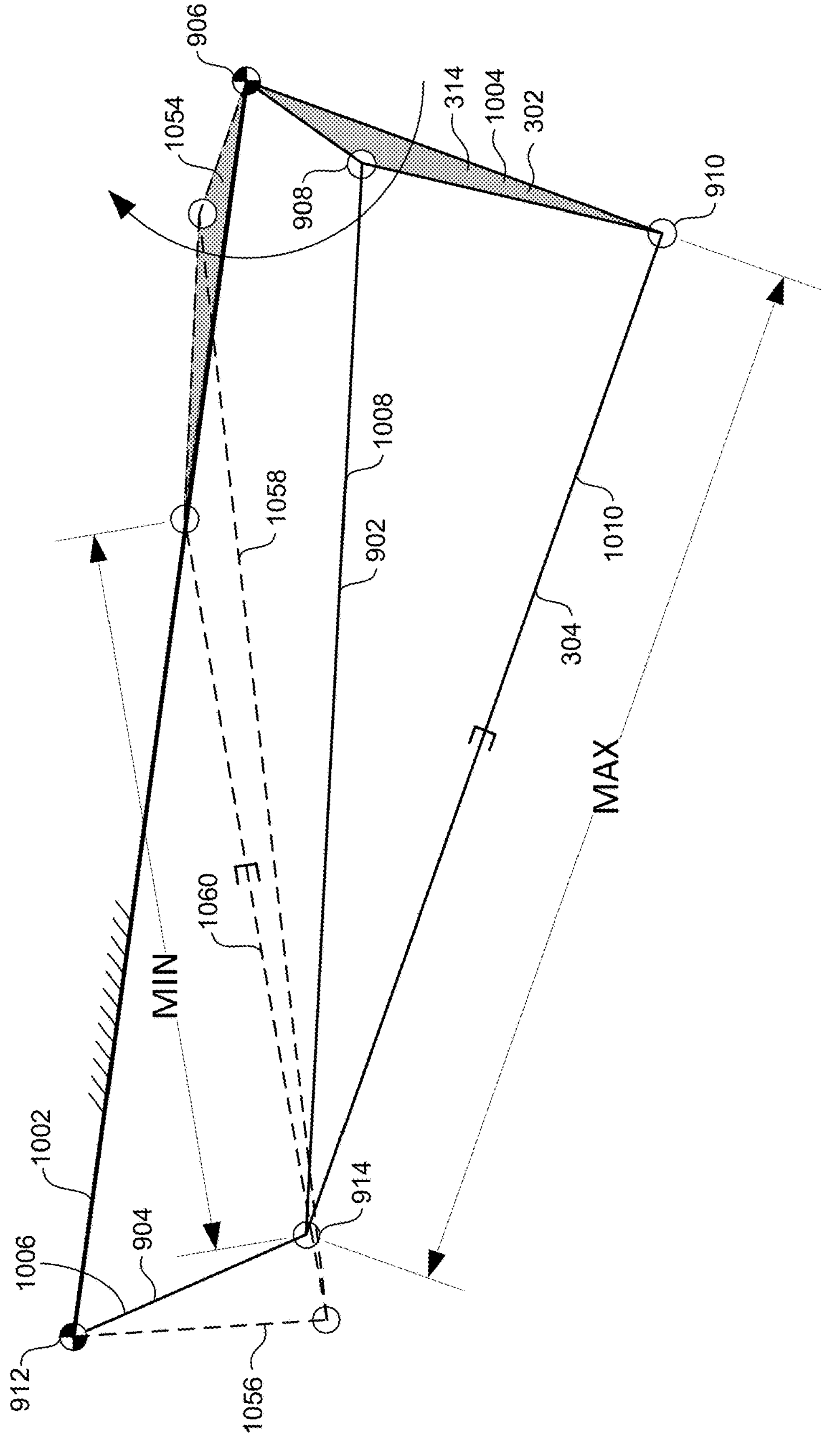
FIG. 10 illustrates example kinematic motion of the example walking beam linkage of FIG. 9 relative to an example aircraft.

FIG. 10 illustrates example kinematic motion of the example walking beam linkage 900 of FIG. 9 relative to an example aircraft 1002. In some examples, the aircraft 1002 of FIG. 10 may be implemented via the aircraft 100 of FIG. 1. In the illustrated example of FIG. 10, the outer cylinder 314 of the landing gear strut 302 is an example first position 1004 relative to the aircraft 1002. The aircraft 1002 is illustrated as being fixed in space. The outer cylinder 314 is rotatable relative to the aircraft 1002 about the first joint 906. The hanger link 904 is in an example first position 1006 relative to the aircraft 1002. The hanger link 904 is rotatable relative to the aircraft 1002 about the fourth joint 912. The walking beam 902 is in an example first position 1008 relative to the aircraft 1002. The walking beam 902 is rotatable relative to the outer cylinder 314 about the second joint 908 and rotatable relative to the hanger link 904 about the fifth joint 914. The transfer cylinder 304 is in an example first position 1010 relative to the aircraft 1002. The transfer cylinder 304 is rotatable relative to the outer cylinder 314 about the third joint 910 and rotatable relative to the hanger link 904 about the fifth joint 914. The transfer cylinder 304 has a maximum length (e.g., an extended length) when the transfer cylinder 304 is positioned in the first position 1010.

In the illustrated example of FIG. 10, the outer cylinder 314 of the landing gear strut 302 may be rotated relative to the aircraft 1002 about the first joint 906 from the first position 1004 to an example second position 1054 (shown in phantom in FIG. 10). In response to the outer cylinder 314 being moved from the first position 1004 to the second position 1054, the hanger link 904 is moved from the first position 1006 to an example second position 1056 (shown in phantom in FIG. 10), the walking beam 902 is moved from the first position 1008 to an example second position 1058 (shown in phantom in FIG. 10), and the transfer cylinder 304 is moved from the first position 1010 to an example second position 1060 (shown in phantom in FIG. 10). The transfer cylinder 304 has a minimum length (e.g., a compressed length) when the transfer cylinder 304 is positioned in the second position 1060.

In the absence of the walking beam 902 and the hanger link 904 illustrated in FIG. 10, a first moment arm associated with rotating and/or retracting the landing gear strut 302 would exist between a line in space passing through the third joint 910 and the fourth joint 912 and a line in space passing through the axis of rotation of the first joint 906. The first moment arm may have an associated first length resulting in the application of an associated force and/or load into the wing-to-side-of-body area of the aircraft at which the fourth joint 912 is located. Implementation of the walking beam 902 and the hanger link 904 of FIGS. 9 and 10 provides for a moment are that is increased in length relative to the first moment arm described above. For example, based on the configuration of the walking beam 902 and the hanger link 904 illustrated in FIGS. 9 and 10, a second moment arm associated with rotating and/or retracting the landing gear strut 302 exists between a line in space passing through the fourth joint 912 and the fifth joint 914 and a line in space passing through the axis of rotation of the first joint 906. The second moment arm has an associated second length resulting in the application of an associated force and/or load into the wing-to-side-of-body area of the aircraft at which the fourth joint 912 is located. The second length of the second moment arm is increased relative to the first length of the first moment arm, thereby resulting in the application of a force and/or load associated with the second moment arm that is reduced relative to the application of the force and/or load associated with the first moment arm.

Figure 11:
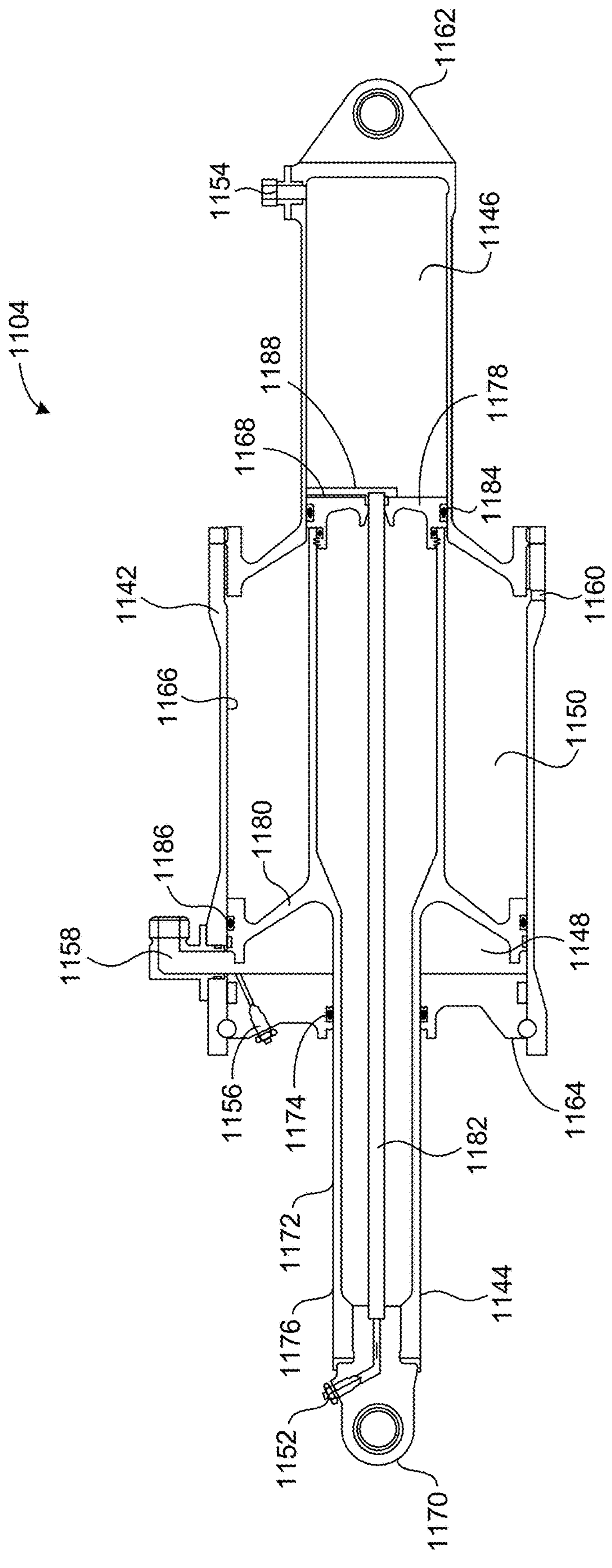
FIG. 11 illustrates an alternative example transfer cylinder to be implemented with the example hydraulic shrink system of FIG. 3 and/or the example walking beam linkage 900 of FIG. 9.

FIG. 11 illustrates an alternative example transfer cylinder 1104 to be implemented with the example hydraulic shrink system 300 of FIG. 3 and/or the example walking beam linkage 900 of FIG. 9. In the illustrated example of FIG. 11, the alternative transfer cylinder 1104 includes an example barrel 1142, an example transfer piston 1144, an example cylinder shrink volume 1146, an example cylinder gas volume 1148, an example atmospheric gas volume 1150, an example first port 1152, an example second port 1154, an example third port 1156, an example fourth port 1158, and an example fifth port 1160. The barrel 1142 of FIG. 11 includes an example first end 1162, an example second end 1164, and an example inner surface 1166. The transfer piston 1144 of FIG. 11 includes an example first end 1168, an example second end 1170, and an example outer surface 1172. An example barrel seal 1174 is located between the inner surface 1166 of the barrel 1142 and the outer surface 1172 of the transfer piston 1144. The transfer piston 1144 of FIG. 11 also includes an example shaft 1176, an example first body 1178, an example second body 1180, and an example fluid tube 1182. An example first body seal 1184 is located between the first body 1178 of the transfer piston 1144 and the inner surface 1166 of the barrel 1142. An example second body seal 1186 is located between the second body 1180 of the transfer piston 1144 and the inner surface 1166 of the barrel 1142.

In the illustrated example of FIG. 11, the respective functions and/or operations of the barrel 1142, the transfer piston 1144, the cylinder shrink volume 1146, the cylinder gas volume 1148, the atmospheric gas volume 1150, the first port 1152, the second port 1154, the third port 1156, the fourth port 1158, the fifth port 1160, the first end 1162 of the barrel 1142, the second end 1164 of the barrel 1142, the inner surface 1166 of the barrel 1142, the first end 1168 of the transfer piston 1144, the second end 1170 of the transfer piston 1144, the outer surface 1172 of the transfer piston 1144, the barrel seal 1174, the shaft 1176 of the transfer piston 1144, the first body 1178 of the transfer piston 1144, the second body 1180 of the transfer piston 1144, the fluid tube 1182 of the transfer piston 1144, the first body seal 1184, and the second body seal 1186 correspond to the respective functions and/or operations of the barrel 342, the transfer piston 344, the cylinder shrink volume 346, the cylinder gas volume 348, the atmospheric gas volume 350, the first port 352, the second port 354, the third port 356, the fourth port 358, the fifth port 360, the first end 362 of the barrel 342, the second end 364 of the barrel 342, the inner surface 366 of the barrel 342, the first end 368 of the transfer piston 344, the second end 370 of the transfer piston 344, the outer surface 372 of the transfer piston 344, the barrel seal 374, the shaft 376 of the transfer piston 344, the first body 378 of the transfer piston 344, the second body 380 of the transfer piston 344, the fluid tube 382 of the transfer piston 344, the first body seal 384, and the second body seal 386 described above in connection with FIGS. 3, 7 and 8.

In the illustrated example of FIG. 11, an example baffle plate 1188 is coupled (e.g., threaded into) the first body 1178 and/or the first end 1168 of the transfer piston 1144 such that the baffle plate 1188 is located within the cylinder shrink volume 1146. The baffle plate 1188 includes a channel positioned in fluid communication with the cylinder shrink volume 1146 and the fluid tube 1182. The channel of the baffle plate 1188 facilitates the bleeding of air from the cylinder shrink volume 1146 into the fluid tube 1182, and from the fluid tube 1182 out of the alternative transfer cylinder 1104 via the first port 1152. In the illustrated example of FIG. 11, the first port 1152 is a bleed fitting, as is the third port 1156.

From the foregoing, it will be appreciated that the disclosed hydraulic shrink systems implement a transfer cylinder to shrink an aircraft landing gear during and/or in parallel with a hydraulically driven retraction of the landing gear from a deployed position to a retracted position. The shrinking of the landing gear via the transfer cylinder is dependent upon the kinematic motion associated with rotating and/or moving the landing gear from the deployed position to the retracted position. The disclosed hydraulic shrink systems shrink the landing gear in a manner that advantageously reduces (e.g., minimizes) structural loads reacted by the aircraft, and/or operational loads of the hydraulic shrink system.

In some examples, the disclosed hydraulic shrink systems reduce structural loads to be reacted by an aircraft by providing for an exchange of pressurized gas between the landing gear and the transfer cylinder during the retraction and shrinking of the landing gear. In some examples, the disclosed walking beam linkages enable the disclosed hydraulic shrink systems to reduce structural loads to be reacted by an aircraft by increasing a moment arm associated with retracting the landing gear. In some examples, the disclosed hydraulic shrink systems reduce structural loads to be reacted by an aircraft by implementing a pressure-operated check valve to isolate a dynamic increase in gas pressure associated with landing the aircraft to the landing gear, and/or to prevent the dynamic increase in gas pressure from passing to the transfer cylinder.

In some examples, an apparatus is disclosed. In some disclosed examples, the apparatus comprises a landing gear strut, a transfer cylinder, and aircraft hydraulics. In some disclosed examples, the landing gear strut has an outer cylinder and an inner cylinder. In some disclosed examples, the inner cylinder is to move relative to the outer cylinder from a first position to a second position as the landing gear strut moves from a deployed position to a retracted position. In some disclosed examples, the landing gear strut has a first length when the inner cylinder is in the first position and a second length less than the first length when the inner cylinder is in the second position. In some disclosed examples the transfer cylinder is to exchange hydraulic fluid and gas with the landing gear strut as the landing gear strut moves from the deployed position to the retracted position. In some disclosed examples, the aircraft hydraulics are to hydraulically actuate the landing gear strut to move from the deployed position to the retracted position.

In some disclosed examples, the apparatus further comprises a pressure-operated check valve operatively coupled to the aircraft hydraulics, the transfer cylinder, and the landing gear strut. In some disclosed examples, the pressure-operated check valve is to control an exchange of gas between the transfer cylinder and the landing gear strut based on hydraulic fluid received at the pressure-operated check valve from the aircraft hydraulics.

In some disclosed examples, the aircraft hydraulics are to provide hydraulic fluid to the pressure-operated check valve as the landing gear strut moves from the deployed position to the retracted position. In some disclosed examples, pressurized gas from a strut gas volume of the landing gear strut passes through the pressure-operated check valve and into a cylinder gas volume of the transfer cylinder in response to the aircraft hydraulics providing hydraulic fluid to the pressure-operated check valve. In some disclosed examples, the pressure-operated check valve is to prevent pressurized gas contained within the strut gas volume from passing into the cylinder gas volume when the pressure-operated check valve is not receiving hydraulic fluid from the aircraft hydraulics.

In some disclosed examples, the landing gear strut includes a strut shrink piston, a strut shrink volume, a strut liquid volume, a strut gas volume, a first port, and a second port. In some disclosed examples, the strut shrink volume is in fluid communication with the first port. In some disclosed examples, the strut shrink piston is located between the outer cylinder and the inner cylinder within the strut shrink volume. In some disclosed examples, the strut liquid volume is in fluid communication with the strut gas volume. In some disclosed examples, the strut gas volume is in fluid communication with the second port. In some disclosed examples, the first port is in fluid communication with the transfer cylinder. In some disclosed examples, the second port is in fluid communication with the pressure-operated check valve.

In some disclosed examples, the strut shrink volume includes first pressurized hydraulic fluid. In some disclosed examples, the strut liquid volume includes second pressurized hydraulic fluid isolated from the first pressurized hydraulic fluid. In some disclosed examples, the strut gas volume includes pressurized gas.

In some disclosed examples, the strut shrink piston is to move the inner cylinder away from the first position and toward the second position in response to an increase in the strut shrink volume, the strut gas volume to decrease in response to the increase in the strut shrink volume.

In some disclosed examples, the transfer cylinder includes a barrel and a transfer piston. In some disclosed examples, the transfer piston is to move relative to the barrel from an extended position to a compressed position as the landing gear strut moves from the deployed position to the retracted position. In some disclosed examples, the transfer cylinder has a first length when the transfer piston is in the extended position and a second length less than the first length when the transfer piston is in the compressed position.

In some disclosed examples, the transfer cylinder further includes a cylinder shrink volume, a cylinder gas volume, an atmospheric gas volume, a first port, a second port, and a third port. In some disclosed examples, the cylinder shrink volume is in fluid communication with the first port of the transfer cylinder. In some disclosed examples, the cylinder gas volume is in fluid communication with the second port of the transfer cylinder. In some disclosed examples, the atmospheric gas volume is in fluid communication with the third port of the transfer cylinder. In some disclosed examples, the first port of the transfer cylinder is in fluid communication with the landing gear strut. In some disclosed examples, the second port of the transfer cylinder is in fluid communication with the pressure-operated check valve.

In some disclosed examples, the cylinder shrink volume includes pressurized hydraulic fluid. In some disclosed examples, the cylinder gas volume includes pressurized gas isolated from the pressurized hydraulic fluid. In some disclosed examples, the atmospheric gas volume includes atmospheric gas isolated from the pressurized hydraulic fluid and the pressurized gas.

In some disclosed examples, the transfer piston is to decrease the cylinder shrink volume and increase the cylinder gas volume as the landing gear strut moves from the deployed position to the retracted position.

In some disclosed examples, the transfer piston includes a shaft, a first body, and a second body. In some disclosed examples, the shaft is movable relative to the barrel. In some disclosed examples, the first body extends radially from the shaft and is located between the cylinder shrink volume and the atmospheric gas volume. In some disclosed examples, the second body extends radially from the shaft and is located between the cylinder gas volume and the atmospheric gas volume.

In some disclosed examples, the apparatus further comprises a compensator and a compensator check valve. In some disclosed examples, the compensator is in fluid communication with the compensator check valve. In some disclosed examples, the compensator check valve is in fluid communication with a strut shrink volume of the landing gear strut and a cylinder shrink volume of the transfer cylinder. In some disclosed examples, the compensator includes a compensator shrink volume and a spring-operated compensator piston. In some disclosed examples, the spring-operated compensator piston is to bias pressurized hydraulic fluid contained in the compensator shrink volume to flow from the compensator to the compensator check valve. In some disclosed examples, the spring-operated compensator piston includes an indicator to indicate a volume of pressurized hydraulic fluid remaining in the compensator shrink volume.

In some disclosed examples, the apparatus further comprising a walking beam and a hanger link. In some disclosed examples, the outer cylinder of the landing gear strut is rotatably coupled to a wing of an aircraft. In some disclosed examples, the hanger link has a first end and a second end. In some disclosed examples, the first end of the hanger link is rotatably coupled to the aircraft. In some disclosed examples, the walking beam has a first end and a second end. In some disclosed examples, the first end of the walking beam is rotatably coupled to the outer cylinder. In some disclosed examples, the second end of the walking beam is rotatably coupled to the second end of the hanger link. In some disclosed examples, the transfer cylinder has a first end and a second end. In some disclosed examples, the first end of the transfer cylinder is rotatably coupled to the outer cylinder. In some disclosed examples, the second end of the transfer cylinder is rotatably coupled to the second end of the hanger link and to the second end of the walking beam.

In some examples, an apparatus is disclosed. In some disclosed examples, the apparatus comprises a landing gear strut, a transfer cylinder, aircraft hydraulics, a pressure-operated check valve, and a walking beam linkage. In some disclosed examples, the landing gear strut is rotatably coupled to a wing of an aircraft. In some disclosed examples, the landing gear strut has an outer cylinder and an inner cylinder. In some disclosed examples, the inner cylinder is to move relative to the outer cylinder from a first position to a second position as the landing gear strut rotates from a deployed position to a retracted position. In some disclosed examples, the landing gear strut has a first length when the inner cylinder is in the first position and a second length less than the first length when the inner cylinder is in the second position. In some disclosed examples the transfer cylinder is to exchange hydraulic fluid and gas with the landing gear strut as the landing gear strut rotates from the deployed position to the retracted position. In some disclosed examples, the aircraft hydraulics are to hydraulically actuate the landing gear strut to rotate from the deployed position to the retracted position. In some disclosed examples, the pressure-operated check valve is operatively coupled to the aircraft hydraulics, the transfer cylinder, and the landing gear strut. In some disclosed examples, the pressure-operated check valve is to control an exchange of gas between the transfer cylinder and the landing gear strut based on hydraulic fluid received at the pressure-operated check valve from the aircraft hydraulics. In some disclosed examples, the walking beam linkage is coupled to the landing gear strut, the transfer cylinder, and the aircraft. In some disclosed examples, the walking beam linkage is to transmit a load to the aircraft as the landing gear strut rotates from the deployed position to the retracted position.

In some disclosed examples, the landing gear strut includes a strut shrink piston, a strut shrink volume, a strut liquid volume, a strut gas volume, a first port, and a second port. In some disclosed examples, the strut shrink volume is in fluid communication with the first port. In some disclosed examples, the strut shrink piston is located between the outer cylinder and the inner cylinder within the strut shrink volume. In some disclosed examples, the strut liquid volume is in fluid communication with the strut gas volume. In some disclosed examples, the strut gas volume is in fluid communication with the second port. In some disclosed examples, the first port is in fluid communication with the transfer cylinder. In some disclosed examples, the second port is in fluid communication with the pressure-operated check valve.

In some disclosed examples, the transfer cylinder includes a barrel and a transfer piston. In some disclosed examples, the transfer piston is to move relative to the barrel from an extended position to a compressed position as the landing gear strut rotates from the deployed position to the retracted position. In some disclosed examples, the transfer cylinder has a first length when the transfer piston is in the extended position and a second length less than the first length when the transfer piston is in the compressed position.

In some disclosed examples, the transfer cylinder further includes a cylinder shrink volume, a cylinder gas volume, an atmospheric gas volume, a first port, a second port, and a third port. In some disclosed examples, the cylinder shrink volume is in fluid communication with the first port of the transfer cylinder. In some disclosed examples, the cylinder gas volume is in fluid communication with the second port of the transfer cylinder. In some disclosed examples, the atmospheric gas volume is in fluid communication with the third port of the transfer cylinder. In some disclosed examples, the first port of the transfer cylinder is in fluid communication with the landing gear strut. In some disclosed examples, the second port of the transfer cylinder is in fluid communication with the pressure-operated check valve.

In some disclosed examples, the transfer piston includes a shaft, a first body, and a second body. In some disclosed examples, the shaft is movable relative to the barrel. In some disclosed examples, the first body extends radially from the shaft and is located between the cylinder shrink volume and the atmospheric gas volume. In some disclosed examples, the second body extends radially from the shaft and is located between the cylinder gas volume and the atmospheric gas volume.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:

a landing gear strut having an outer cylinder and an inner cylinder, the inner cylinder to move relative to the outer cylinder from a first position to a second position as the landing gear strut moves from a deployed position to a retracted position, the landing gear strut having a first length when the inner cylinder is in the first position and a second length less than the first length when the inner cylinder is in the second position;

a transfer cylinder to exchange a first pressurized hydraulic fluid and a pressurized gas with the landing gear strut as the landing gear strut moves from the deployed position to the retracted position;

aircraft hydraulics to hydraulically actuate the landing gear strut to move from the deployed position to the retracted position; and a pressure-operated check valve operatively coupled to the aircraft hydraulics and operatively positioned between the transfer cylinder and the landing gear strut, the pressure-operated check valve to control the exchange of the pressurized gas between the transfer cylinder and the landing gear strut based on a second pressurized hydraulic fluid received at the pressure-operated check valve from the aircraft hydraulics as the landing gear strut moves from the deployed position to the retracted position, wherein the pressurized gas passes from a strut gas volume of the landing gear strut through the pressure-operated check valve and into a cylinder gas volume of the transfer cylinder in response to the aircraft hydraulics providing the second pressurized hydraulic fluid to the pressure-operated check valve.

2. The apparatus of claim 1, wherein the pressure-operated check valve is to prevent the pressurized gas contained within the strut gas volume from passing into the cylinder gas volume when the pressure-operated check valve is not receiving the second pressurized hydraulic fluid from the aircraft hydraulics.

3. The apparatus of claim 1, wherein the landing gear strut includes a strut shrink piston, a strut shrink volume, a strut liquid volume, a first port, and a second port, the strut shrink volume being in fluid communication with the first port, the strut shrink piston being located between the outer cylinder and the inner cylinder within the strut shrink volume, the strut liquid volume being in fluid communication with the strut gas volume, the strut gas volume being in fluid communication with the second port, the first port being in fluid communication with the transfer cylinder, the second port being in fluid communication with the pressure-operated check valve.

4. The apparatus of claim 3, wherein the strut shrink volume includes the first pressurized hydraulic fluid, the strut liquid volume includes a third pressurized hydraulic fluid isolated from the first pressurized hydraulic fluid, and the strut gas volume includes the pressurized gas.

5. The apparatus of claim 3, wherein the strut shrink piston is to move the inner cylinder away from the first position and toward the second position in response to an increase in the strut shrink volume, the strut gas volume to decrease in response to the increase in the strut shrink volume.

6. The apparatus of claim 1, wherein the transfer cylinder includes a barrel and a transfer piston, the transfer piston to move relative to the barrel from an extended position to a compressed position as the landing gear strut moves from the deployed position to the retracted position, the transfer cylinder having a first length when the transfer piston is in the extended position and a second length less than the first length when the transfer piston is in the compressed position.

7. The apparatus of claim 6, wherein the transfer cylinder further includes a cylinder shrink volume, an atmospheric gas volume, a first port, a second port, and a third port, the cylinder shrink volume being in fluid communication with the first port of the transfer cylinder, the cylinder gas volume being in fluid communication with the second port of the transfer cylinder, the atmospheric gas volume being in fluid communication with the third port of the transfer cylinder, the first port of the transfer cylinder being in fluid communication with the landing gear strut, the second port of the transfer cylinder being in fluid communication with the pressure-operated check valve.

8. The apparatus of claim 7, wherein the cylinder shrink volume includes the first pressurized hydraulic fluid, the cylinder gas volume includes the pressurized gas, and the atmospheric gas volume includes atmospheric gas, and wherein the first pressurized hydraulic fluid the pressurized gas, and the atmospheric gas are isolated from one another.

9. The apparatus of claim 7, wherein the transfer piston is to decrease the cylinder shrink volume and increase the cylinder gas volume as the landing gear strut moves from the deployed position to the retracted position.

10. The apparatus of claim 7, wherein the transfer piston includes a shaft, a first body, and a second body, the shaft being movable relative to the barrel, the first body extending radially from the shaft and being located between the cylinder shrink volume and the atmospheric gas volume, the second body extending radially from the shaft and being located between the cylinder gas volume and the atmospheric gas volume.

11. The apparatus of claim 1, further comprising a compensator and a compensator check valve, the compensator being in fluid communication with the compensator check valve, the compensator check valve being in fluid communication with a strut shrink volume of the landing gear strut and a cylinder shrink volume of the transfer cylinder, the compensator including a compensator shrink volume and a spring-operated compensator piston, the spring-operated compensator piston to bias a third pressurized hydraulic fluid contained in the compensator shrink volume to flow from the compensator to the compensator check valve, the spring-operated compensator piston including an indicator to indicate a volume of the third pressurized hydraulic fluid remaining in the compensator shrink volume.

12. An apparatus comprising:

a landing gear strut having an outer cylinder and an inner cylinder, the outer cylinder being rotatably coupled to a wing of an aircraft, the inner cylinder to move relative to the outer cylinder from a first position to a second position as the landing gear strut moves from a deployed position to a retracted position, the landing gear strut having a first length when the inner cylinder is in the first position and a second length less than the first length when the inner cylinder is in the second position;

a transfer cylinder to exchange a pressurized hydraulic fluid and a pressurized gas with the landing gear strut as the landing gear strut moves from the deployed position to the retracted position;

aircraft hydraulics to hydraulically actuate the landing gear strut to move from the deployed position to the retracted position; and a walking beam linkage including a walking beam and a hanger link, the hanger link having a first end and a second end, the first end of the hanger link being rotatably coupled to the aircraft, the walking beam having a first end and a second end, the first end of the walking beam being rotatably coupled to the outer cylinder, the second end of the walking beam being rotatably coupled to the second end of the hanger link, the transfer cylinder having a first end and a second end, the first end of the transfer cylinder being rotatably coupled to the outer cylinder, the second end of the transfer cylinder being rotatably coupled to the second end of the hanger link and to the second end of the walking beam.

13. The apparatus of claim 12, wherein the pressurized hydraulic fluid exchanged between the transfer cylinder and the landing gear strut is a first pressurized hydraulic fluid, the apparatus further comprising a pressure-operated check valve operatively coupled to the aircraft hydraulics and operatively positioned between the transfer cylinder and the landing gear strut, the pressure-operated check valve to control the exchange of the pressurized gas between the transfer cylinder and the landing gear strut based on a second pressurized hydraulic fluid received at the pressure-operated check valve from the aircraft hydraulics as the landing gear strut moves from the deployed position to the retracted position, wherein the pressurized gas passes from a strut gas volume of the landing gear strut through the pressure-operated check valve and into a cylinder gas volume of the transfer cylinder in response to the aircraft hydraulics providing the second pressurized hydraulic fluid to the pressure-operated check valve.

14. The apparatus of claim 13, wherein the landing gear strut includes a strut shrink piston, a strut shrink volume, a strut liquid volume, a first port, and a second port, the strut shrink volume being in fluid communication with the first port, the strut shrink piston being located between the outer cylinder and the inner cylinder within the strut shrink volume, the strut liquid volume being in fluid communication with the strut gas volume, the strut gas volume being in fluid communication with the second port, the first port being in fluid communication with the transfer cylinder, the second port being in fluid communication with the pressure-operated check valve.

15. The apparatus of claim 14, wherein the strut shrink volume includes the first pressurized hydraulic fluid, the strut liquid volume includes a third pressurized hydraulic fluid isolated from the first pressurized hydraulic fluid, and the strut gas volume includes the pressurized gas.

16. The apparatus of claim 14, wherein the strut shrink piston is to move the inner cylinder away from the first position and toward the second position in response to an increase in the strut shrink volume, the strut gas volume to decrease in response to the increase in the strut shrink volume.

17. The apparatus of claim 13, wherein the transfer cylinder includes a barrel and a transfer piston, the transfer piston to move relative to the barrel from an extended position to a compressed position as the landing gear strut rotates from the deployed position to the retracted position, the transfer cylinder having a first length when the transfer piston is in the extended position and a second length less than the first length when the transfer piston is in the compressed position.

18. The apparatus of claim 17, wherein the transfer cylinder further includes a cylinder shrink volume, an atmospheric gas volume, a first port, a second port, and a third port, the cylinder shrink volume being in fluid communication with the first port of the transfer cylinder, the cylinder gas volume being in fluid communication with the second port of the transfer cylinder, the atmospheric gas volume being in fluid communication with the third port of the transfer cylinder, the first port of the transfer cylinder being in fluid communication with the landing gear strut, the second port of the transfer cylinder being in fluid communication with the pressure-operated check valve.

19. The apparatus of claim 18, wherein the transfer piston includes a shaft, a first body, and a second body, the shaft being movable relative to the barrel, the first body extending radially from the shaft and being located between the cylinder shrink volume and the atmospheric gas volume, the second body extending radially from the shaft and being located between the cylinder gas volume and the atmospheric gas volume.

20. The apparatus of claim 18, wherein the cylinder shrink volume includes the first pressurized hydraulic fluid, the cylinder gas volume includes the pressurized gas, and the atmospheric gas volume includes atmospheric gas, and wherein the first pressurized hydraulic fluid, the pressurized gas, and the atmospheric gas are isolated from one another.

21. The apparatus of claim 18, wherein the transfer piston is to decrease the cylinder shrink volume and increase the cylinder gas volume as the landing gear strut moves from the deployed position to the retracted position.

22. The apparatus of claim 13, wherein the pressure-operated check valve is to prevent the pressurized gas contained within the strut gas volume from passing into the cylinder gas volume when the pressure-operated check valve is not receiving the second pressurized hydraulic fluid from the aircraft hydraulics.

* * * * *